United States Patent
Topchy et al.

(10) Patent No.: US 11,942,099 B2
(45) Date of Patent: Mar. 26, 2024

(54) AUDIO WATERMARKING FOR PEOPLE MONITORING

(71) Applicant: The Nielsen Company (US), LLC, New York, NY (US)

(72) Inventors: Alexander Topchy, New Port Richey, FL (US); Padmanabhan Soundararajan, Tampa, FL (US); Venugopal Srinivasan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/565,167

(22) Filed: Dec. 29, 2021

(65) Prior Publication Data
US 2022/0122618 A1  Apr. 21, 2022

Related U.S. Application Data

(63) Continuation of application No. 16/426,979, filed on May 30, 2019, now Pat. No. 11,250,865, which is a (Continued)

(51) Int. Cl.
*G10L 19/018* (2013.01)
*H04H 60/45* (2008.01)
(Continued)

(52) U.S. Cl.
CPC ............ *G10L 19/018* (2013.01); *H04H 60/45* (2013.01); *G06F 21/1063* (2023.08); *H04H 60/51* (2013.01); *H04H 2201/50* (2013.01)

(58) Field of Classification Search
CPC ............. H04N 19/467; H04N 21/8358; H04N 2201/3233; G06F 2221/0733; G06F 21/10; G10L 19/018
See application file for complete search history.

(56) References Cited

U.S. PATENT DOCUMENTS

| | | |
|---|---|---|
| 5,450,490 A | 9/1995 | Jensen et al. |
| 5,764,763 A | 6/1998 | Jensen et al. |

(Continued)

FOREIGN PATENT DOCUMENTS

| | | |
|---|---|---|
| AU | 2014400791 B2 | 5/2018 |
| AU | 2018222996 | 9/2018 |

(Continued)

OTHER PUBLICATIONS

IP Australia "Notice of Acceptance for Patent Application" dated Mar. 17, 2022, in connection with AU application No. 2020217384, 3 pages.

(Continued)

*Primary Examiner* — Mark Villena

(57) ABSTRACT

Disclosed example people monitoring methods include detecting a first watermark in a first audio signal obtained from an acoustic sensor, the first watermark identifying media presented by a monitored media device, determining whether a second watermark, different from the first watermark, is embedded in the first audio signal obtained from the acoustic sensor, the second watermark identifying at least one of a mobile device or a user of the mobile device, classifying the second watermark as a media watermark or a people monitoring watermark based on a characteristic of the second watermark, and when the second watermark is determined to be embedded in the first audio signal, reporting at least one of the second watermark or information decoded from the second watermark to identify at least one of the mobile device or the user of the mobile device as being exposed to the media presented by the monitored media device.

20 Claims, 10 Drawing Sheets

Related U.S. Application Data continuation of application No. 14/332,055, filed on Jul. 15, 2014, now Pat. No. 10,410,643.

(51) Int. Cl.
*G06F 21/10* (2013.01)
*H04H 60/51* (2008.01)

(56) References Cited

U.S. PATENT DOCUMENTS

| | | |
|---|---|---|
| 6,252,522 B1 | 6/2001 | Hampton et al. |
| 6,737,957 B1 | 5/2004 | Petrovic et al. |
| 6,775,557 B2 | 8/2004 | Tsai |
| 6,952,774 B1 | 10/2005 | Kirovski et al. |
| 7,006,555 B1 | 2/2006 | Srinivasan |
| 7,069,238 B2 | 6/2006 | I'Anson et al. |
| 7,181,159 B2 | 2/2007 | Breen |
| 7,239,981 B2 | 7/2007 | Kolessar et al. |
| 7,471,987 B2 | 12/2008 | Crystal et al. |
| 7,587,067 B1 | 9/2009 | Schiller |
| 7,823,772 B2 | 11/2010 | Vawter |
| 7,986,231 B1 | 7/2011 | Bentley et al. |
| 8,229,458 B2 | 7/2012 | Busch |
| 8,245,043 B2 | 8/2012 | Cutler |
| 8,300,849 B2 | 10/2012 | Smirnov et al. |
| 8,355,910 B2 | 1/2013 | McMillan et al. |
| 8,539,527 B2 | 9/2013 | Wright et al. |
| 8,543,061 B2 | 9/2013 | Suhami |
| 8,655,011 B2 | 2/2014 | Hannigan et al. |
| 9,635,404 B2 | 4/2017 | McMillan |
| 9,767,823 B2 | 9/2017 | Villette et al. |
| 10,410,643 B2 | 9/2019 | Topchy et al. |
| 11,250,865 B2 | 2/2022 | Topchy et al. |
| 2002/0174219 A1 | 11/2002 | Mei et al. |
| 2003/0018784 A1 | 1/2003 | Lette et al. |
| 2003/0154073 A1 | 8/2003 | Ota et al. |
| 2004/0169581 A1 | 9/2004 | Petrovic et al. |
| 2005/0055214 A1 | 3/2005 | Kirovski et al. |
| 2005/0144006 A1 | 6/2005 | Oh |
| 2007/0003057 A1 | 1/2007 | Lemma et al. |
| 2007/0220263 A1 | 9/2007 | Ziener et al. |
| 2008/0002854 A1 | 1/2008 | Tehranchi et al. |
| 2008/0165958 A1* | 7/2008 | Matsushita ........... H04L 9/0836 380/44 |
| 2008/0313713 A1 | 12/2008 | Cutler |
| 2009/0037575 A1 | 2/2009 | Crystal et al. |
| 2009/0055854 A1 | 2/2009 | Wright et al. |
| 2009/0136081 A1 | 5/2009 | Mamidwar et al. |
| 2009/0186639 A1 | 7/2009 | Tsai |
| 2009/0222848 A1 | 9/2009 | Ramaswamy |
| 2009/0256972 A1 | 10/2009 | Ramaswamy et al. |
| 2009/0326690 A1 | 12/2009 | Turchetta et al. |
| 2010/0042843 A1 | 2/2010 | Brunk et al. |
| 2010/0268540 A1 | 10/2010 | Arshi et al. |
| 2010/0268573 A1 | 10/2010 | Jain et al. |
| 2010/0280641 A1 | 11/2010 | Harkness et al. |
| 2010/0322035 A1 | 12/2010 | Rhoads et al. |
| 2011/0033061 A1* | 2/2011 | Sakurada ............... G10H 3/186 381/81 |
| 2011/0066437 A1 | 3/2011 | Luff |
| 2011/0068898 A1 | 3/2011 | Petrovic et al. |
| 2011/0126222 A1 | 5/2011 | Wright et al. |
| 2011/0144998 A1 | 6/2011 | Grill et al. |
| 2011/0164784 A1 | 7/2011 | Grill et al. |
| 2011/0230161 A1 | 9/2011 | Newman |
| 2011/0246202 A1 | 10/2011 | McMillan et al. |
| 2012/0116559 A1 | 5/2012 | Davis et al. |
| 2012/0203561 A1 | 8/2012 | Villette et al. |
| 2012/0214544 A1 | 8/2012 | Shivappa et al. |
| 2012/0239407 A1 | 9/2012 | Lynch et al. |
| 2012/0277893 A1 | 11/2012 | Davis et al. |
| 2012/0308071 A1* | 12/2012 | Ramsdell ............. H04N 21/8456 382/100 |
| 2012/0311620 A1 | 12/2012 | Conklin |
| 2013/0007790 A1* | 1/2013 | McMillan ............. G06T 1/0092 725/14 |
| 2013/0103172 A1 | 4/2013 | McMillan et al. |
| 2013/0119133 A1 | 5/2013 | Michael et al. |
| 2013/0152139 A1 | 6/2013 | Davis et al. |
| 2013/0160042 A1 | 6/2013 | Stokes et al. |
| 2013/0171926 A1 | 7/2013 | Perret et al. |
| 2013/0205311 A1 | 8/2013 | Ramaswamy et al. |
| 2013/0227595 A1 | 8/2013 | Nielsen et al. |
| 2013/0253918 A1 | 9/2013 | Jacobs |
| 2013/0262687 A1 | 10/2013 | Avery et al. |
| 2014/0026159 A1* | 1/2014 | Cuttner ............... H04N 21/8106 725/19 |
| 2014/0059587 A1 | 2/2014 | Davis et al. |
| 2014/0088742 A1 | 3/2014 | Srinivasan et al. |
| 2014/0108020 A1 | 4/2014 | Sharma et al. |
| 2014/0142958 A1 | 5/2014 | Sharma et al. |
| 2014/0150001 A1* | 5/2014 | McMillan ........ H04N 21/44213 725/9 |
| 2014/0156285 A1 | 6/2014 | Jax |
| 2014/0172435 A1 | 6/2014 | Thiergart et al. |
| 2014/0250449 A1 | 9/2014 | Ramaswamy |
| 2014/0253326 A1 | 9/2014 | Cho et al. |
| 2014/0254801 A1 | 9/2014 | Srinivasan et al. |
| 2014/0278933 A1 | 9/2014 | McMillan |
| 2014/0282664 A1* | 9/2014 | Lee ................... H04N 21/8358 725/18 |
| 2014/0282669 A1 | 9/2014 | McMillan |
| 2014/0282693 A1 | 9/2014 | Soundararajan et al. |
| 2014/0344033 A1 | 11/2014 | Driscoll |
| 2015/0016661 A1* | 1/2015 | Lord ................ H04N 21/42203 382/100 |
| 2015/0023546 A1 | 1/2015 | Strein |
| 2015/0092106 A1 | 4/2015 | Savare et al. |
| 2015/0149297 A1 | 5/2015 | Mahadevan et al. |
| 2015/0341890 A1 | 11/2015 | Corbellini et al. |
| 2016/0019901 A1 | 1/2016 | Topchy et al. |
| 2016/0066032 A1* | 3/2016 | Grant ................... H04N 21/812 725/19 |
| 2017/0050108 A1 | 2/2017 | Johnson et al. |

FOREIGN PATENT DOCUMENTS

| | | |
|---|---|---|
| CN | 1638479 A | 7/2005 |
| CN | 101371472 A | 2/2009 |
| CN | 101536512 A | 9/2009 |
| CN | 102265536 A | 11/2011 |
| CN | 102385862 A | 3/2012 |
| CN | 102981418 A | 3/2013 |
| CN | 106537495 B | 2/2020 |
| EP | 2835917 | 2/2015 |
| EP | 3170175 A1 | 5/2017 |
| EP | 3913627 | 11/2021 |
| WO | 0106755 | 1/2001 |
| WO | 2014137384 | 9/2014 |
| WO | 2016010574 | 1/2016 |

OTHER PUBLICATIONS

Korean Intellectual Property Office, "Notice of Final Rejection," mailed in connection with Korean Patent Application No. 10-2017-7001444, dated Mar. 19, 2019, 6 pages.

European Patent Office, "Communication Pursuant to Article 94(3) EPC," mailed in connection with European Patent Application No. 14897835.6, dated Mar. 14, 2019, 6 pages.

State Intellectual Property Office of China, "Office Action," mailed in connection with Chinese Patent Application No. 201480080654.8, dated Mar. 26, 2019, 21 pages.

Korean Intellectual Property Office, "Notice of Allowance," mailed in connection with Korean Patent Application No. 10-2017-7001444, dated May 1, 2019, 3 pages.

IP Australia, "Notice of Acceptance for Patent Application," mailed in connection with Australian Patent Application No. 2014400791, dated May 18, 2018, 3 pages.

Korean Intellectual Property Office, "Notice of Preliminary Rejection," mailed in connection with Korean Patent Application No. 10-2017-7001444, dated Sep. 10, 2018, 11 pages.

(56) References Cited

OTHER PUBLICATIONS

Canadian Intellectual Property Office, "Examination Report," mailed in connection with Canadian Patent Application No. 2,954,865, dated Sep. 14, 2018, 5 pages.
European Patent Office, "European Search Report," mailed in connection with European Patent Application No. 14897835.6, dated Nov. 28, 2017, 10 pages.
Wang et al., "A Novel Security Mobile Payment System Based on Watermarked Voice Cheque," 2nd International Conference on Guangzhou, China, Nov. 2005, 4 pages.
Canadian Intellectual Property Office, "Examination Report," mailed in connection with Canadian Patent Application No. 2,954,865, dated Oct. 26, 2017, 4 pages.
IP Australia, "Examination Report," mailed in connection with Australian Patent Application No. 2014400791, dated Aug. 18, 2017, 4 pages.
International Searching Authority, "International Search Report," mailed in connection with International Patent Application No. PCT/US2014/068176, dated Mar. 27, 2015, 3 pages.
International Searching Authority, "Written Opinion," mailed in connection with International Patent Application No. PCT/US2014/068176, dated Mar. 27, 2015, 7 pages.
Ewing, "Digital Watermarking," Forging the Frontier of Content Identification, Dec. 2006, 5 pages. Retrieved from musicalwinfo.com.
Musictrace Gmbh, "Watermark Embedding for Audio Signals," May 29, 2014, 3 pages. Retrieved from musictrace.com.
United States Patent and Trademark Office, "Notice of Allowance," mailed in connection with U.S. Appl. No. 14/332,055, dated Mar. 11, 2019, 9 pages.
United States Patent and Trademark Office, "Non-final Office Action," mailed in connection with U.S. Appl. No. 14/332,055, dated Jul. 6, 2018, 16 pages.
United States Patent and Trademark Office, "Final Office Action," mailed in connection with U.S. Appl. No. 14/332,055, dated Jan. 11, 2018, 15 pages.
United States Patent and Trademark Office, "Non-final Office Action," mailed in connection with U.S. Appl. No. 14/332,055, dated Jul. 14, 2017, 15 pages.
United States Patent and Trademark Office, "Final Office Action," mailed in connection with U.S. Appl. No. 14/332,055, dated Jan. 5, 2017, 13 pages.
United States Patent and Trademark Office, "Non-final Office Action," mailed in connection with U.S. Appl. No. 14/332,055, dated May 19, 2016, 12 pages.
Canadian Intellectual Property Office, "Office Action," mailed in connection with Canadian Patent Application No. 2,954,865, dated Jul. 11, 2019, 4 pages.
IP Australia, "Examination Report No. 1," mailed in connection with Australian Patent Application No. 2018222996, dated Oct. 21, 2019, 2 pages.
European Patent Office, "Communication Pursuant to Article 94(3) EPC," mailed in connection with European Patent Application No. 14897835.6, dated Sep. 24, 2019, 4 pages.
China National Intellectual Property Administration, "Notification to Grant the Patent Right for Invention," mailed in connection with Chinese Patent Application No. 201480080654.8, dated Oct. 21, 2019, 4 pages.
Intellectual Property Office of the United Kingdom, "Examination Report," mailed in connection with Patent Application No. GB1700906.9, dated Jul. 1, 2020, 2 pages.
Mexican Institute of Industrial Property, "Office Action," mailed in connection with Mexican Patent Application No. MX/a/2017/000333, dated Nov. 11, 2020, 8 pages.
European Patent Office, "Communication under Rule 71(3) EPC," mailed in connection with European Patent Application No. 14897835.6, dated Feb. 2, 2021, 52 pages.
Intellectual Property Office of the United Kingdom, "Combined Search and Examination Report," mailed in connection with GB Patent Application No. 2102386.6, dated Mar. 5, 2021, 4 pages.
Intellectual Property Office of Great Britain, "Examination Report," mailed in connection with GB Patent Application No. GB2102386.6, dated Jul. 22, 2021, 3 pages.
IP Australia, "Examination Report," mailed in connection with Australian Patent Application No. 2020217384, dated Jul. 19, 2021, 3 pages.
Extended European Search Report mailed by the European Patent Office in corresponding European Patent Application No. 21185539.0-1210 dated Aug. 6, 2021 (10 pages).
United States Patent and Trademark Office, "Notice of Allowance," mailed in connection with U.S. Appl. No. 16/426,979, dated Dec. 16, 2021, 5 pages.
United States Patent and Trademark Office, "Notice of Allowance," mailed in connection with U.S. Appl. No. 16/426,979, dated Aug. 25, 2021, 9 pages.
United States Patent and Trademark Office, "Final Rejection," mailed in connection with U.S. Appl. No. 16/426,979, dated Nov. 13, 2020, 13 pages.
United States Patent and Trademark Office, "Non-Final Rejection," mailed in connection with U.S. Appl. No. 16/426,979, dated Apr. 6, 2020, 14 pages.
Canadian Intellectual Property Office, "Office Action," mailed in connection with Canadian Patent Application No. 3,100,159, dated Jan. 11, 2022, 4 pages.
State Intellectual Property Office of China, "First Office Action," dated Feb. 27, 2023, in connection with Chinese Patent Application No. 202010009161.2, 20 pages. (English Translation Included).
International Searching Authority, "International Preliminary Report on Patentability", issued in connection with PCT No. PCT/US2014/068176, dated Jan. 17, 2017, 8 pages.
Australian Government, IP Australia,"Notice of Acceptance," issued in connection with AU Application No. 2018222996, dated May 1, 2020, 3 pages.
United Kingdom Intellectual Property Office, "Examination Report and Notification under Section 18 (3)," issued in connection with United Kingdom Patent Application No. 1700906.9, dated Sep. 1, 2020, 2 pages.
United Kingdom Intellectual Property Office, "Examination Report and Notification of Intention to Grant under Section 18(4)," issued in connection with United Kingdom Patent Application No. 1700906.9, dated Jan. 20, 2021, 2 pages.
United Kingdom Intellectual Property Office, "Notification of Grant," issued in connection with United Kingdom Patent Application No. 1700906.9 dated Mar. 9, 2021, 2 pages.
European Patent Office, "Decision to grant a European patent," issued in connection with European patent application No. 14897835.6, dated Jun. 24, 2021, 2 pages.

* cited by examiner

AUDIO WATERMARKING FOR PEOPLE MONITORING

RELATED APPLICATION(S)

This patent arises from a continuation of U.S. patent application Ser. No. 16/426,979 (now U.S. Pat. No. 11,250,865), which is titled "AUDIO WATERMARKING FOR PEOPLE MONITORING," and which was filed on May 30, 2019, which is a continuation of U.S. patent application Ser. No. 14/332,055 (now U.S. Pat. No. 10,410,643), which is titled "AUDIO WATERMARKING FOR PEOPLE MONITORING," and which was filed on Jul. 15, 2014. Priority to U.S. patent application Ser. No. 16/426,979 and U.S. patent application Ser. No. 14/332,055 is hereby expressly claimed. U.S. patent application Ser. No. 16/426,979 and U.S. patent application Ser. No. 14/332,055 are hereby incorporated by reference in their respective entireties.

FIELD OF THE DISCLOSURE

This disclosure relates generally to audio watermarking and, more particularly, to audio watermarking for people monitoring.

BACKGROUND

Audience measurement systems typically include one or more site meters to monitor the media presented by one or more media devices located at a monitored site. Many such audience measurement systems also include one or more people meters to obtain information characterizing the composition(s) of the audience(s) in the vicinity of the media device(s) being monitored. In prior audience measurement systems, the people meters typically are separate from the site meters, or employ different signal processing technology than that employed by the site meters. For example, the site meters may be configured to process media signals captured from the monitored media devices to detect watermarks embedded in the media signals, whereas the people meters may be configured to capture and process images of an audience, and/or process input commands entered by members of the audience.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
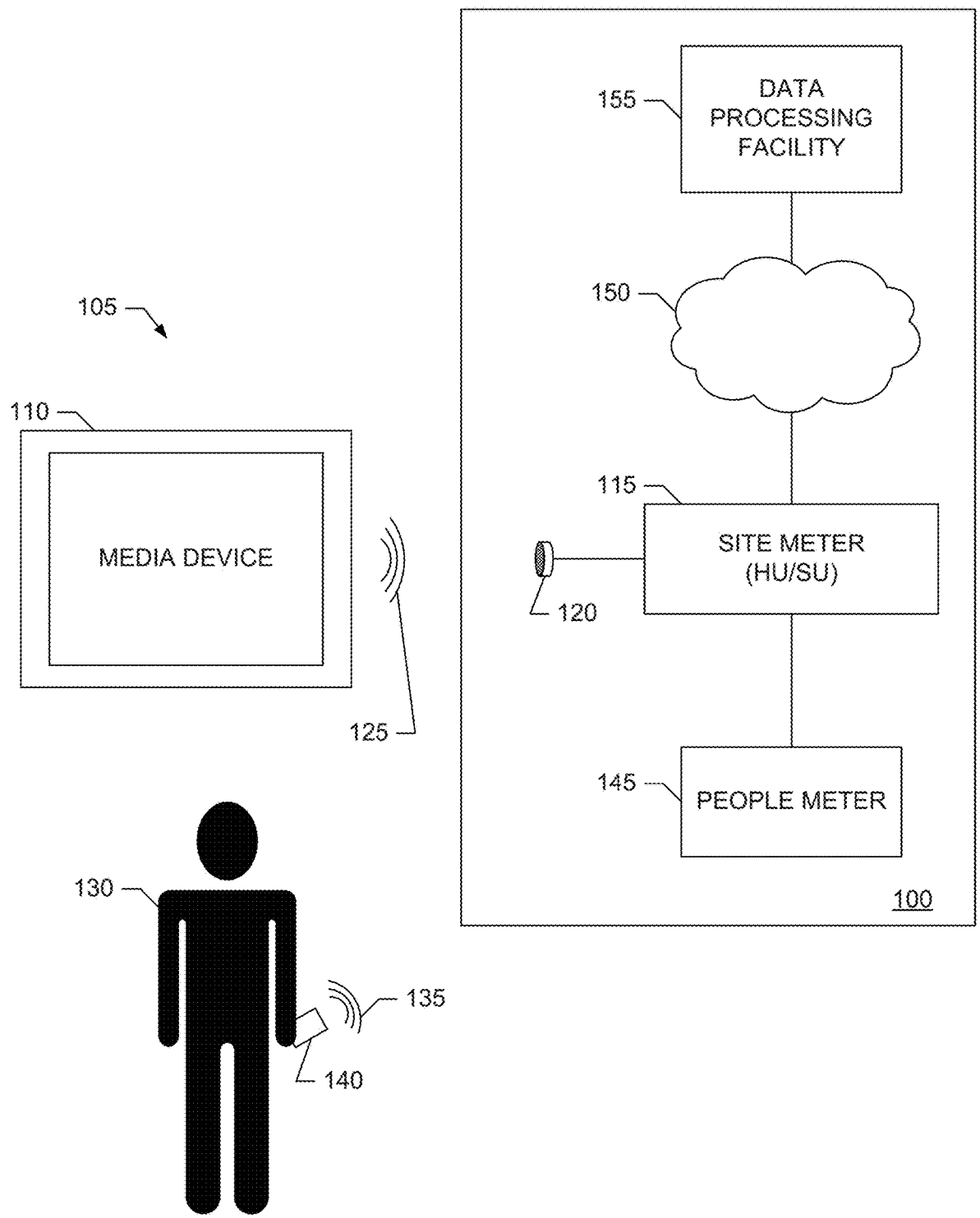
FIG. 1 is a block diagram of an example audience measurement system employing audio watermarks for people monitoring as disclosed herein.

Methods, apparatus, systems and articles of manufacture (e.g., physical storage media) to utilize audio watermarking for people monitoring are disclosed herein. Some example people monitoring methods disclosed herein include determining, at a user device, whether a first trigger condition for emitting an audio watermark identifying at least one of the user device or a user of the user device is satisfied. Such disclosed example methods also include, in response to determining that the first trigger condition is satisfied, providing a first audio signal including the audio watermark to an audio circuit that is to output an acoustic signal from the user device.

In some such examples, the first trigger condition is satisfied when an input audio signal sensed at the user device satisfies an audio threshold.

Some such disclosed example methods further include downloading a software application to the user device. In such examples, the software application determines whether the first trigger condition is satisfied and provides the first audio signal to the audio circuit.

In some such disclosed example methods, the first audio signal includes only the audio watermark, whereas in other disclosed example methods, the first audio signal includes the audio watermark combined with a second signal.

Some such disclosed example methods further include determining a level of an input audio signal, and adjusting a level of the first audio signal based on the level of the input audio signal. For example, adjusting the level of the first audio signal may include adjusting the level of the first audio signal to cause the first audio signal to be substantially masked by a source of the input audio signal when the acoustic signal is output from the user device.

In some such disclosed example methods, the audio watermark is a first audio watermark conveyed in a first range of frequencies different from a second range of frequencies used to convey a second audio watermark included in an input audio signal sensed by the user device.

Some such disclosed example methods further include determining, at the user device, whether a second trigger condition is satisfied, and in response to determining that the first trigger condition and the second trigger condition are satisfied, but not if either the first trigger condition or the second trigger condition is not satisfied, providing the first audio signal including the audio watermark to the audio circuit. In some such examples, the second trigger condition is satisfied when a location of the user device is determined to correspond to a first geographical area including a monitored media device. In some such examples, the second trigger condition is satisfied when a current time at the user device corresponds to a first time period. In some such examples, the second trigger condition is satisfied when a second audio signal is being provided to the audio circuit.

Some example people monitoring methods disclosed herein include detecting, with a processor (e.g., such as a site meter), a first watermark in a first audio signal obtained from an acoustic sensor. In such examples, the first watermark identifies media presented by a monitored media device, and the acoustic sensor is to sense audio in a vicinity of the monitored media device. Such disclosed example methods also include processing, with the processor, the first audio signal obtained from the acoustic sensor to determine whether a second watermark, different from the first watermark, is embedded in the first audio signal. In such examples, the second watermark identifies at least one of a user device or a user of the user device. Such disclosed example methods further include, when the second watermark is determined to be embedded in the first audio signal, reporting at least one of the second watermark or information decoded from the second watermark to identify at least one of the user device or the user of the user device as being exposed to the media presented by the monitored media device.

In some such disclosed example methods, the first watermark is conveyed in a first range of frequencies different from a second range of frequencies used to convey the second watermark.

In some such disclosed example methods, the first watermark is substantially inaudible to the user of the user device and the second watermark is substantially inaudible to the user of the user device, whereas in other such disclosed example methods, the first watermark is substantially inaudible to the user of the user device and the second watermark is substantially audible to the user of the user device.

In some such disclosed example methods, the first watermark is included in a media signal output from the monitored media device, and the second watermark is output from the user device.

These and other example methods, apparatus, systems and articles of manufacture (e.g., physical storage media) to utilize audio watermarking for people detection are disclosed in further detail below.

As mentioned above, in prior audience measurement systems, the people meters used to obtain information characterizing audience composition typically are separate from the site meters used to monitor the media presented by one or more media devices located at a monitored site, or employ signal processing technology different than that employed by the site meters. Unlike such prior systems, example audience measurement systems implementing audio watermarking for people monitoring as disclosed herein are able to reuse the processing technology and capabilities of the site meters to also perform people monitoring. For example, some example audience measurement systems disclosed herein utilize people monitoring watermarks embedded in an acoustic signal output from a user device, such as the user's mobile phone, to identify the user device and/or the user as being in the vicinity of a monitored media device. In such examples, the site meter that is detecting media watermarks embedded in the media presented by the media device is also able to detect the people monitoring watermarks output from the user device.

In some disclosed examples, the people monitoring watermarks output from the user device are caused to be output by a software application downloaded to the user device, and/or are embedded in ringtones and/or other audio signals to be output by the user device during normal operation. In examples in which the people monitoring watermarks are caused to be output by a software application, the software application may evaluate one or more trigger conditions to optimize when to output the people monitoring watermarks, as disclosed in further detail below. In such examples, the site meter can correlate detection of the people monitoring watermarks with one or more of those trigger conditions. In examples in which the people monitoring watermarks are embedded in ringtones and/or other audio signals to be output by the user device during normal operation, the site meter may rely on opportunistic detection of the people monitoring watermarks to identify the user device and/or the user as being exposed to the media presented by the monitored media device.

In the context of media monitoring, watermarks may be transmitted within media signals. For example, watermarks can be used to transmit data (e.g., such as identification codes, ancillary codes, etc.) with media (e.g., inserted into the audio, video, or metadata stream of media) to uniquely identify broadcasters and/or media (e.g., content or advertisements), and/or to convey other information. Watermarks are typically extracted using a decoding operation.

In contrast, signatures are a representation of some characteristic of the media signal (e.g., a characteristic of the frequency spectrum of the signal). Signatures can be thought of as fingerprints. Signatures are typically not dependent upon insertion of identification codes (e.g., watermarks) in the media, but instead preferably reflect an inherent characteristic of the media and/or the signal transporting the media. Systems to utilize codes (e.g., watermarks) and/or signatures for media monitoring are long known. See, for example, Thomas, U.S. Pat. No. 5,481,294, which is hereby incorporated by reference in its entirety.

Turning to the figures, a block diagram of an example audience metering system 100 employing audio watermarking for people monitoring as disclosed herein is illustrated in FIG. 1. The example audience measurement system 100 supports monitoring of audience exposure to media presented at one or more monitored sites, such as the example monitored site 105 illustrated in FIG. 1. The monitored site 105 includes an example media presentation device 110. Although the example of FIG. 1 illustrates one monitored site 105, audio watermarking for people monitoring as disclosed herein can be used in audience measurement systems 100 supporting any number of monitored sites 105.

The audience measurement system 100 of the illustrated example includes an example site meter 115, also referred to as a site unit 115, a home unit 115, an audience measurement meter 115, etc., to monitor media presented by the media presentation device 110. In the illustrated example, the site meter 115 includes an example acoustic sensor 120, such as, but not limited to, a microphone, to sense acoustic signals 125 output (e.g., emitted) by the media presentation device 110. The site meter 115 of the illustrated example processes the resulting audio signals obtained from the acoustic sensor 120 to monitor the media presented by the media presentation device 110.

Additionally, the example site meter 115 of FIG. 1 supports audio watermarking for people monitoring as disclosed herein, which enables the site meter 115 to monitor people present in the vicinity (e.g., in the presentation area) of the media presentation device 110, such as the example person 130 of the illustrated example. For example, and as disclosed in further detail below, the acoustic sensor 120 of the site meter 115 is able to sense example acoustic signals 135 output (e.g., emitted) by an example user device 140. The acoustic signals 135 include one or more audio watermarks capable of, for example, identifying the user device 140 and/or the user 130 of the user device 140. In the illustrated example of FIG. 1, the site meter 115 processes the resulting audio signals obtained from the acoustic sensor 120 to not only monitor the media being presented by the media presentation device 110, but to also detect people monitoring audio watermarks conveyed by acoustic signals output by user devices, such as the audio watermark(s) conveyed by the example acoustic signal 135 output by the example user device 140. Such audio watermarks are also referred to herein as people monitoring audio watermarks, people monitoring watermarks, etc., to distinguish them from media watermarks conveyed in the media presented by the media devices, such as the example media presentation device 110. As disclosed in further detail below, in some examples, the people monitoring watermarks enable determination of other characteristics, in addition to the identity of the user 130 and/or the identity of the user device 140, related to the exposure of the user 130 (or the user device 140) to the media presented by media presentation device 110.

In some examples, the audience measurement system 100 further includes an example people meter 145 to capture information about the audience exposed to media presented by the media presentation device 110. For example, the people meter 145 may be configured to receive information via an input device having a set of input keys, each assigned to represent a single audience member. In such examples, the people meter 145 prompts the audience members to indicate their presence by pressing the appropriate input key on the input device of the people meter 145. The people meter 145 of the illustrated example may also receive information from the site meter 115 to determine times at which to prompt the audience members to enter information on people meter 145.

In the illustrated example of FIG. 1, the site meter 115 determines audience measurement data characterizing media exposure at the monitored site 105 by combining device metering data (also referred to as media data, tuning data, etc.), which is determined by monitoring the media presentation device 110, with audience identification data (also referred to as demographic data, people monitoring data, etc.), which is determined from the people monitoring watermarks detected by the site meter 115, as well as from data provided by the people meter 145, if present. The site meter 115 then stores and reports this audience measurement data via an example network 150 to an example data processing facility 155. The data processing facility 155 performs any appropriate post-processing of the audience measurement data to, for example, determine audience ratings information, identify targeted advertising to be provided to the monitored site 105, etc. In the illustrated example, the network 150 can correspond to any type(s) and/or number of wired and/or wireless data networks, or any combination thereof.

In the illustrated example, the media presentation device 110 monitored by the site meter 115 can correspond to any type of audio, video and/or multimedia presentation device capable of presenting media content audibly and/or visually. For example, the media presentation device 110 can correspond to a television and/or display device that supports the National Television Standards Committee (NTSC) standard, the Phase Alternating Line (PAL) standard, the Systeme Electronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As another example, the media presentation device 110 can correspond to a multimedia computer system, a personal digital assistant, a cellular/mobile smartphone, a radio, etc.

In the illustrated example, the user device 140 can correspond to any type of user device capable of emitting audio/acoustic signals. In some examples, the user device 140 is implemented by a portable device of the user, such as, but not limited to, a mobile phone or smartphone, a tablet (e.g., such as an iPad™), a personal digital assistant (PDA), a portable gaming device, etc., adapted to support audio watermarking for people monitoring in addition to its native functionality. In some examples, the user device 140 is implemented by a portable device dedicated to people monitoring, such as a portable people meter (PPM) to be carried the audience member 130. Also, although only one user device 140 is depicted in the example illustrated in FIG. 1, the example audience measurement system 100 can support any number and/or type(s) of user devices 140.

The site meter 115 included in the audience measurement system 100 of the illustrated example can correspond to any type of metering device capable of monitoring media presented by the media presentation device 110. In the illustrated example, the site meter 115 employs non-invasive monitoring not involving any physical connection to the media presentation device 110. For example, the site meter 115 processes audio signals obtained from the media presentation device 110 via the acoustic sensor 120 (e.g., a microphone) to detect media and/or source identifying audio watermarks embedded in audio portion(s) of the media presented by the media presentation device 110, to detect people monitoring audio watermarks embedded in the audio signals (e.g., acoustic signals) emitted by user devices, such as the acoustic signals 135 emitted by the user device 140, etc. In some examples, the site meter 115 may additionally utilize invasive monitoring involving one or more physical connections to the media presentation device 110. In such examples, the site meter 115 may additionally process audio signals obtained from the media presentation device 110 via a direct cable connection to detect media and/or source identifying audio watermarks embedded in such audio signals. In some examples, the site meter 115 may process video signals obtained from the media presentation device 110 via a camera and/or a direct cable connection to detect media and/or source identifying video watermarks embedded in video portion(s) of the media presented by the media presentation device 110. In some examples, the site meter 115 may process the aforementioned audio signals and/or video signals to generate respective audio and/or video signatures from the media presented by the media presentation device 110, which can be compared to reference signatures to perform source and/or content identification. Any other type(s) and/or number of media monitoring techniques can be supported by the site meter 115.

Figure 2:
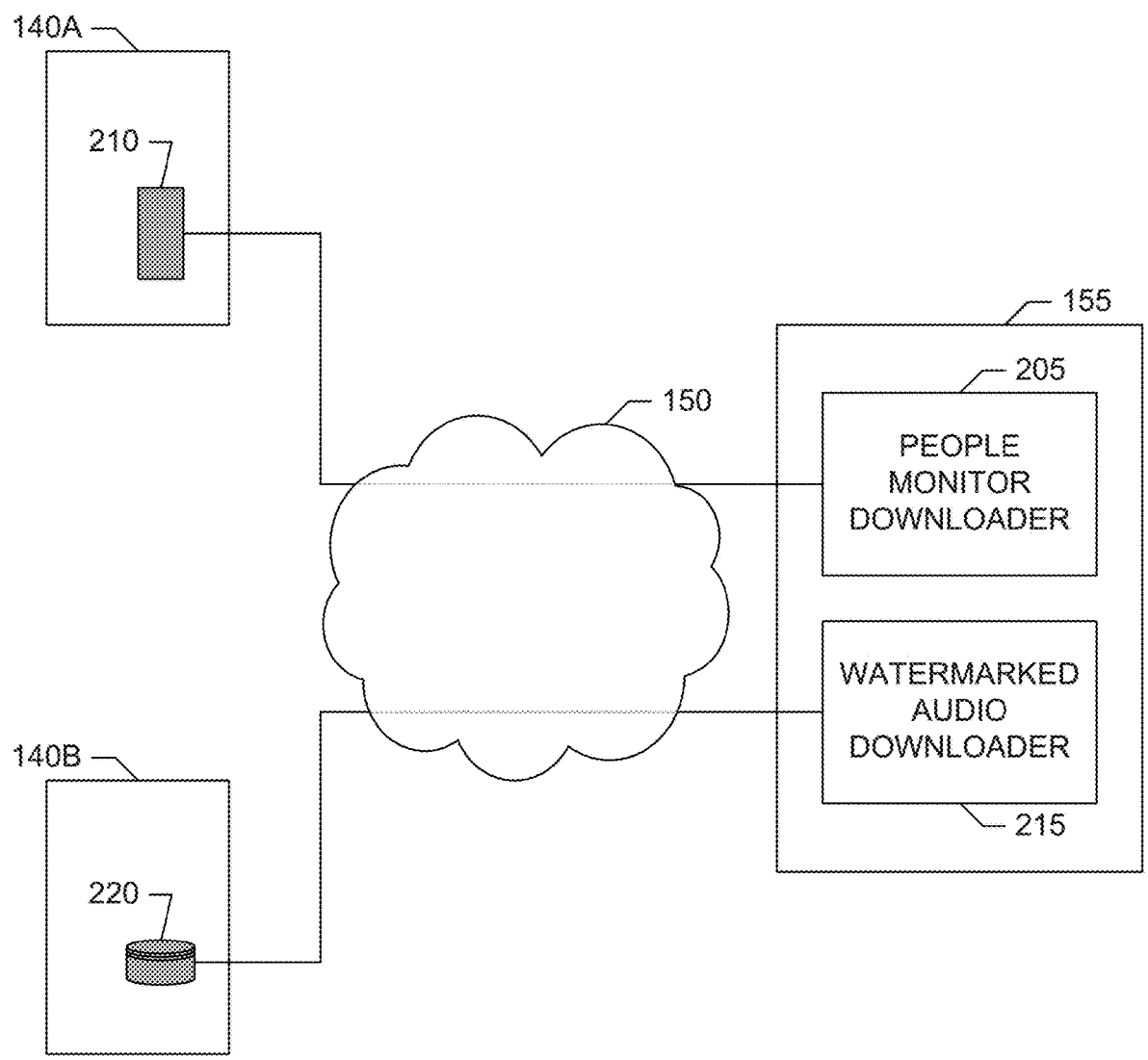
FIG. 2 is a block diagram illustrating example user devices and an example data processing facility that may be used to implement the example audience measurement system of FIG. 1.

FIG. 2 illustrates example user devices 140A-B that may be used to implement the example user device 140 included in or otherwise operable with the example audience measurement system of FIG. 1. FIG. 2 also illustrates an example implementation of the example data processing facility 155 included in the example audience measurement system of FIG. 1. In the illustrated example of FIG. 2, the example data processing facility 155 includes an example people monitor downloader 205 to facilitate download of an example people monitoring watermarker 210 to a user device, such as the example user device 140A. For example, the people monitoring watermarker 210 can be implemented by one or more applications (apps) capable of being downloaded to and executed by the example user device 140A. In such examples, the people monitor downloader 205 stores the application(s) implementing the people monitoring watermarker 210, and may store different versions of the applications tailored for different types of user devices 140A. In the illustrated example, the people monitor downloader 205 receives a request via the network 150 from the user device 140A to download the people monitoring watermarker 210. The example people monitor downloader 205 then responds to the request by sending, via the network 150, the application(s) implementing the people monitoring watermarker 210 to the requesting user device 140A. The user device 140A then installs and executes the application(s) implementing the people monitoring watermarker 210.

As disclosed in further detail below, the people monitoring watermarker 210 causes the user device 140A to emit acoustic signals, such as the acoustic signal 135, which include one or more people monitoring audio watermarks. As described above, the people monitoring audio watermark(s) identify the user device 140A and/or a user (e.g., the user 130) operating or otherwise associated with the user device 140A. In some examples, the people monitoring watermarker 210 evaluates one or more trigger conditions that condition when the people monitoring watermarker 210 is to cause the people monitoring audio watermarks to be output by the user device 140A. For example, and as disclosed in further detail below, such trigger conditions can be based on an input audio level measured by the people monitoring watermarker 210, a time of day, a geographic location, an operating state of the user device 140A, etc. In such examples, detection of a people monitoring audio watermark (e.g., by the site meter 115) can be correlated to the trigger condition(s) that would trigger the people monitoring watermarker 210 to cause the people monitoring audio watermarks to be output by the user device 140A. An example implementation of the people monitoring watermarker 210 is illustrated in FIG. 3, which is described in further detail below.

In the illustrated example of FIG. 2, the example data processing facility 155 additionally or alternatively includes an example watermarked audio downloader 215 to download watermarked audio data to a user device, such as the example user device 140B. In the illustrated example, the watermarked audio data includes, for example, any audio data, such as ringtones, audible alerts, audio tracks, movies, etc., capable of being presented (e.g., output) by the user device 140B. The watermarked audio data provided by the watermarked audio downloader 215 includes people monitoring audio watermark(s) embedded in or otherwise combined with the audio data. In the illustrated example, the watermarked audio downloader 215 receives a request via the network 150 from the user device 140B to download audio data. The example watermarked audio downloader 215 then responds to the request by sending, via the network 150, the requested audio data, which contains or is otherwise combined with the people monitoring watermark(s), to the requesting user device 140B. The user device 140B then stores the watermarked audio data in an example audio data store 220 for subsequent use. The example audio data store 220 can correspond to any type of memory, storage, data structure, database, etc., capable of storing audio data for subsequent retrieval.

In some examples, the user device 140B outputs (e.g., emits) people monitoring watermark(s) whenever the user device 140B presents (e.g., outputs, plays, etc.) the downloaded audio data containing the people monitoring watermark(s). For example, when the watermarked audio data downloaded from the watermarked audio downloader 215 corresponds to a ringtone or audible alert, the user device 140B outputs (e.g., emits) people monitoring watermark(s) whenever the user device 140B plays the ringtone, outputs the audio alert, etc. Similarly, when the watermarked audio data downloaded from the watermarked audio downloader 215 corresponds an audio track, movie, etc., the user device 140B outputs (e.g., emits) people monitoring watermark(s) whenever the user device 140B presents the audio track, movie, etc.

Figure 3:
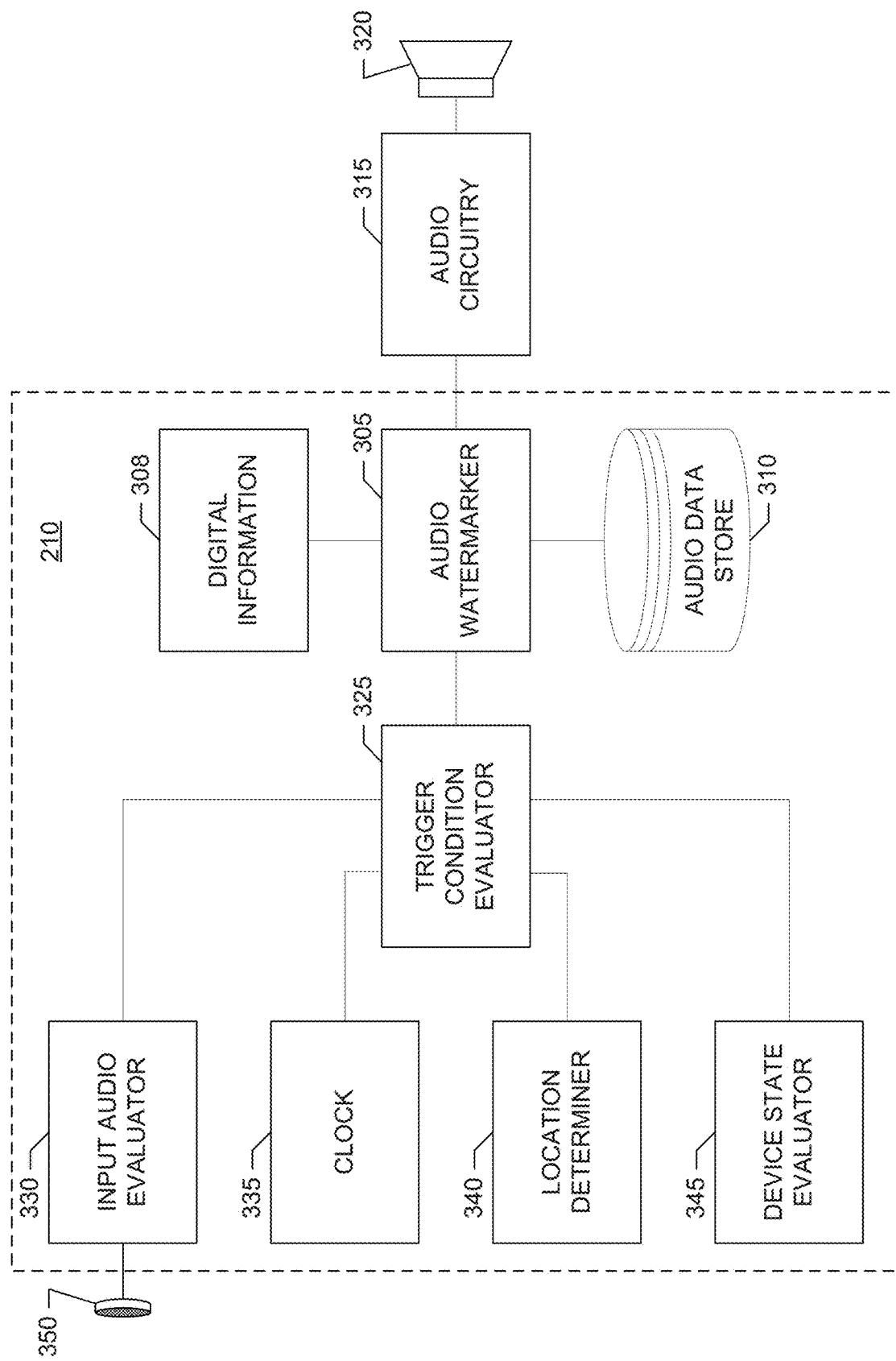
FIG. 3 is a block diagram of an example people monitoring watermarker that may be used to implement one or more of the example user devices in the examples of FIGS. 1 and/or 2.

A block diagram of an example implementation of the people monitoring watermarker 210 of FIG. 2 is illustrated in FIG. 3. In some examples, the people monitoring watermarker 210 is implemented by one or more applications downloaded to a user device, such as the user devices 140 and/or 140A. In some examples, the people monitoring watermarker 210 is implemented by a combination of hardware and/or software included in the user device (e.g., the user devices 140 and/or 140A), and one or more applications downloaded to the user device. In some examples, the people monitoring watermarker 210 is implemented by a combination of hardware and/or software included in the user device (e.g., the user devices 140 and/or 140A) before the user device is provided to a user, such as the user 130. Other approaches for implementing the people monitoring watermarker 210 can also be used.

In the illustrated example of FIG. 3, the people monitoring watermarker 210 includes an example audio watermarker 305 to generate or otherwise obtain people monitoring watermark(s) that convey digital information 308 identifying one or more of (1) the user device (e.g., the user devices 140 and/or 140A) implementing or otherwise including the people monitoring watermarker 210, (2) a user of the user device, (3) an operating state of the user device, etc., and/or any other information related to people monitoring. As such, in some examples, the digital information 308 conveyed by the people monitoring watermark(s) generated by the example audio watermarker 305 can be static information that does not change over time, dynamic information that changes over time, or a combination thereof. In some examples, the audio watermarker 305 generates the watermark to be a frequency domain watermark capable of conveying this digital information 308 in frequency domain components of an acoustic signal, such as the acoustic signal 135. Example watermark generation techniques that can be implemented by the audio watermarker 305 to generate such frequency domain watermarks include, but are not limited to, the examples disclosed in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, and U.S. Publication No. 2010/0223062, entitled "Methods and Apparatus to Perform Audio Watermarking and Watermark Detection and Extraction," which was published on Sep. 2, 2010, all of which are hereby incorporated by reference in their respective entireties. U.S. Pat. Nos. 8,359, 205, 8,369,972 and U.S. Publication No. 2010/0223062 describe example watermarking systems in which a watermark is embedded in an audio signal by manipulating a set of frequencies of the audio signal.

In some examples, the audio watermarker 305 generates the watermark signal to be a time domain watermark capable of conveying digital information in time domain components of an acoustic signal, such as the acoustic signal 135. In such examples, audio watermarker 305 may generate a watermark signal that is to modulate the amplitude and/or phase of an audio signal in the time domain. Example watermark generation techniques that can be implemented by the audio watermarker 305 to generate such time domain watermarks include, but are not limited to, generating a spread spectrum time domain signal modulated by the digital information, which is to then be embedded in (e.g., added to) the audio signal used to generate the acoustic signal 135.

In some examples, the people monitoring watermark(s) generated or otherwise obtained by audio watermarker 305 reside in the audible frequency range (e.g., the range of frequencies generally within the range of human hearing.) In some examples, the people monitoring watermark(s) generated or otherwise obtained by audio watermarker 305 reside outside (e.g., above and/or below) the audible frequency range. In some examples, the people monitoring watermark(s) generated or otherwise obtained by audio watermarker 305 have one or more characteristics that differentiate the people monitoring watermark(s) from other types of audio watermarks, such as audio watermarks embedded in the media presented by the media presentation device 110. For example, if the audio watermarks used for monitoring media (e.g., which are embedded in the media presented by the media presentation device 110) reside in a first range of frequencies (e.g., a first frequency band or set of bands), then the people monitoring watermark(s) may reside in a second range of frequencies (e.g., a second frequency band or set of bands) different from the first range of frequencies.

In some examples, the audio watermarker 305 embeds the people monitoring watermark(s) in another audio signal generated by the audio watermarker 305 or obtained from an example audio data store 310. For example, this other audio signal may be a pseudo-noise audio signal generated by the audio watermarker 305 or obtained from an example audio data store 310 to mask the people monitoring watermark(s). In other examples, the other audio signal in which the people monitoring watermark(s) is/are to be embedded may be a tone or melodic audio signal generated by the audio watermarker 305 or obtained from an example audio data store 310. In either of these examples, the audio watermarker 305 applies the audio signal embedded with the people monitoring watermark(s) to example audio circuitry 315 of the user device. The audio circuitry 315 of the illustrated examples processes the watermarked audio signal to generate and emit an acoustic signal, such as the acoustic signal 135, via one or more example speakers 320. The example audio circuitry 315 can be implemented by any existing and/or novel audio circuit technology capable of receiving an audio signal and emitting an appropriate acoustic signal 135 (e.g., such as one that meets one or more design specifications, etc.).

In some examples, the audio watermarker 305 provides the people monitoring watermark(s) to the audio circuitry 315 without embedding the watermark(s) in another audio signal. In such examples, the acoustic signal 135 output from the audio circuitry 315 and speaker(s) 320 may correspond to just the people monitoring watermark(s). In some examples, the audio circuitry 315 may combine the people monitoring watermark(s) provided by the audio watermarker 305 with other audio signals already being output by the user device, such as a ringtone, an audible alert, an audio track, a movie, etc. In some examples, the audio watermarker 305 obtains one or more of the people monitoring watermark(s) from the example audio data store 310 in addition to, or as an alternative to, generating the people monitoring watermark(s). The audio data store 310 can correspond to any type of memory, storage, data structure, database, etc., capable of storing audio data for subsequent retrieval. The audio data store 310 can be the same as, or different from, the audio data store 220.

The example people monitoring watermarker 210 of FIG. 3 also includes an example trigger condition evaluator 325 to evaluate one or more trigger conditions that condition when the example audio watermarker 305 is to provide the people monitoring audio watermark(s) to the example audio circuitry 315. In the illustrated example, the trigger condition evaluator 325 determines whether a trigger condition for emitting the people monitoring watermark(s) has been satisfied. Then, in response to determining that the trigger condition has been satisfied, the trigger condition evaluator 325 causes (e.g., via a signal, a function call, etc.) the audio watermarker 305 to provide an audio signal including the people monitoring watermark(s) to the audio circuitry 315. As described above, this audio signal may include just the people monitoring watermark(s), or may be a combination of the people monitoring audio watermark(s) and another audio signal.

In some examples, the trigger condition evaluator 325 determines whether multiple trigger conditions for emitting the people monitoring watermark(s) have been satisfied. In some such examples, the trigger condition evaluator 325 causes the audio watermarker 305 to provide the audio signal including the people monitoring watermark(s) to the audio circuitry 315 in response to determining that all trigger conditions have been satisfied, but not otherwise. In some examples, the trigger condition evaluator 325 causes the audio watermarker 305 to provide the audio signal including the people monitoring watermark(s) to the audio circuitry 315 in response to determining that at least one trigger condition has been satisfied. In some examples, the trigger condition evaluator 325 causes the audio watermarker 305 to provide the audio signal including the people monitoring watermark(s) to the audio circuitry 315 in response to determining that a combination (e.g., a majority) of the trigger conditions have been satisfied, but not otherwise.

The example people monitoring watermarker 210 of FIG. 3 includes one or more of an example input audio evaluator 330, an example clock 335, an example location determiner 340 and an example device state evaluator 345 to provide trigger condition information to the trigger condition evaluator 325 for evaluation. The input audio evaluator 330 of the illustrated example obtains input audio data corresponding to an input audio signal sensed by an example acoustic sensor 350. For example, the acoustic sensor 350 can be a microphone and/or other acoustic sensor of the user device (e.g., the user device 140 or 140A) implementing or otherwise including the example people monitoring watermarker 210. The example input audio evaluator 330 processes the input audio data to determine a level (e.g., amplitude level, power level, etc.) of the input audio signal, whether the input audio data includes watermarks, such as media identification watermarks, etc. The trigger condition evaluator 325 of the illustrated example uses the input audio level determined by the input audio evaluator 330 to evaluate one or more audio-related trigger conditions. For example, the trigger condition evaluator 325 can determine that an audio level trigger condition is satisfied when the input audio level determined by the input audio evaluator 330 satisfies (e.g., equals or exceeds) an audio threshold. The audio level trigger condition enables the trigger condition evaluator 325 to limit output (e.g., emission) of people monitoring watermark(s) to situations in which the ambient audio is strong enough to be indicative of media being presented by the media presentation device 110. In this way, the trigger condition evaluator 325 can be used to trigger emission of the people monitoring watermark(s) to occur under conditions in which the people monitoring watermark(s) is/are likely to be masked by the media being presented by the media presentation device 110. Additionally or alternatively, the trigger condition evaluator 325 can determine that an watermarked audio trigger condition is satisfied when the input audio evaluator 330 detects a watermark in the input audio data (which may indicate an increased likelihood that a meter, such as the site meter 115, capable of detecting watermark(s) to be emitted by the people monitoring watermarker 210 is nearby).

In some examples, the audio watermarker 305 employs psychoacoustic masking to increase the likelihood that the source of the input audio signal processed by the input audio evaluator 330 (e.g., the audio in the vicinity of the user device, which may correspond to the media presented by the media presentation device 110) will be able to mask the people monitoring watermark(s) emitted by the user device. In some such examples, the audio watermarker 305 uses the input audio level determined by the input audio evaluator 330 to adjust a level of the audio signal, which includes the people monitoring watermark(s), that the audio watermarker 305 is to provide to the audio circuitry 315. For example, the audio watermarker 305 may adjust a level of the audio signal including the people monitoring watermark(s) by applying a gain factor or attenuation factor that causes the level of the audio signal including the people monitoring watermark(s) to be less than or equal to (or a fraction of, etc.) the input audio level determined by the input audio evaluator 330 for the input audio signal. In this way, the people monitoring watermark(s) may reside in the audible frequency range, but may be masked by (e.g., inaudible over) the ambient audio in the vicinity of the media presentation device 110.

The clock 335 of the illustrated example provides clock information (e.g., day and time information) to the trigger condition evaluator 325. The trigger condition evaluator 325 uses the clock information provided by the clock 335 to evaluate one or more clock trigger conditions. For example, the trigger condition evaluator 325 can determine that a clock trigger condition is satisfied when the clock information provided by the clock 335 indicates that the current time (e.g., as determined by the clock 335) is within a specified time period or set of time periods. For example, the trigger condition evaluator 325 may be configured with one or more time periods during which the output (e.g., emission) of people monitoring watermark(s) is or is not permitted. The trigger condition evaluator 325 can then limit emission of people monitoring watermark(s) to the permitted time period(s). For example, the trigger condition evaluator 325 can use the clock information provided by the clock 335 to limit emission of people monitoring watermark(s) to daytime hours when people are not expected to be at work, and not permit people monitoring watermark(s) to be emitted at nighttime (e.g., when people are expected to be asleep), during normal business hours (e.g., when people are expected to be at work), etc.

The location determiner 340 of the illustrated example provides location information (e.g., geographic positioning system (GPS) data and/or other location data, etc.) to the trigger condition evaluator 325. The trigger condition evaluator 325 uses the location information provided by the location determiner 340 to evaluate one or more location trigger conditions. For example, the trigger condition evaluator 325 can determine that a location trigger condition is satisfied when the location information provided by the location determiner 340 indicates that the current location of the user device (e.g., as specified by the location information) is within a specified geographic area or set of geographic areas. For example, the trigger condition evaluator 325 may be configured with one or more geographic areas within which the output (e.g., emission) of people monitoring watermark(s) is or is not permitted. The trigger condition evaluator 325 can then limit emission of people monitoring watermark(s) to occur when the user device is located within the permitted geographic area(s). For example, the trigger condition evaluator 325 can use the location information provided by the location determiner 340 to limit emission of people monitoring watermark(s) to occur when the user device is located at the monitored site 105, and not permit people monitoring watermark(s) to be emitted when the user device is not located at the monitored site 105.

The device state evaluator 345 of the illustrated example provides device state information to the trigger condition evaluator 325. The trigger condition evaluator 325 uses the device state information provided by the location determiner 340 to evaluate one or more device state trigger conditions. For example, the trigger condition evaluator 325 can determine that a device state trigger condition is satisfied when the device state information provided by the device state evaluator 345 indicates that the user device currently has a given operating state. For example, the trigger condition evaluator 325 may be configured with one or more user device operating states during which the output (e.g., emission) of people monitoring watermark(s) is or is not permitted. The trigger condition evaluator 325 can then limit emission of people monitoring watermark(s) to occur when the user device is operating in one or more of the permitted operating states. For example, the trigger condition evaluator 325 can use the device state information provided by the device state evaluator 345 to limit emission of people monitoring watermark(s) to occur when the user device is already outputting another audio signal (e.g., to permit the audio circuitry 315 to combine the watermark(s) with this audio signal), and not permit people monitoring watermark(s) to be emitted when the user device is not already outputting another audio signal. As another example, the trigger condition evaluator 325 can use the device state information provided by the device state evaluator 345 to limit emission of people monitoring watermark(s) to occur when the user device is in an idle operating state, and not permit people monitoring watermark(s) to be emitted when the user device is performing a native operation, such as making a phone call, etc.

Figure 4:
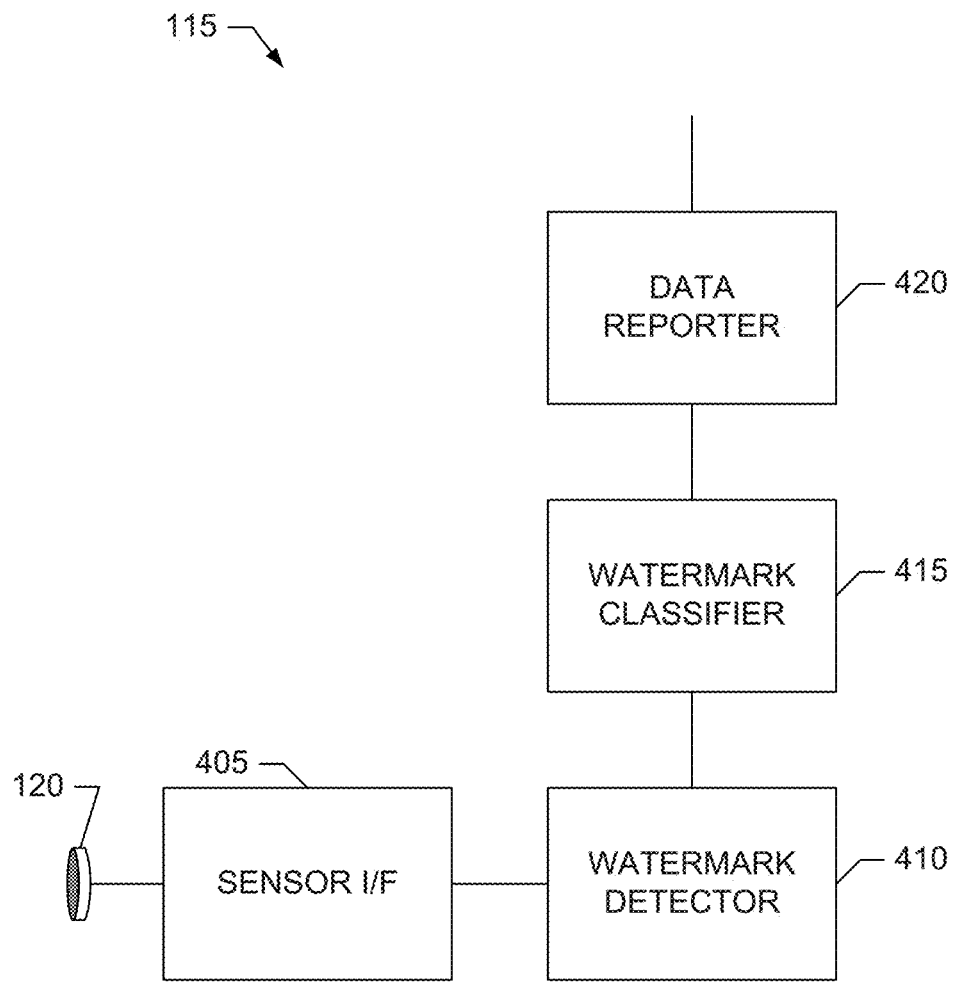
FIG. 4 is a block diagram of an example meter that may be used to implement the example audience measurement system of FIG. 1.

A block diagram of an example implementation of the site meter 115 of FIG. 1 is illustrated in FIG. 4. The example site meter 115 of FIG. 4 includes an example sensor interface 405 to obtain audio data from one or more of the example acoustic sensors 120 included in and/or in communication with the site meter 115. In the illustrated example, the acoustic sensor(s) 120 may include one or more microphones, audio transducers, etc., capable of sensing acoustic signals, such as the example acoustic signals 125 and/or 135. The sensor interface 405 of the illustrated example includes any appropriate sensor interface technology (e.g., such as an audio gain control stage, an analog-to-digital conversion stage, etc.) to process the output(s) of the acoustic sensor(s) 120 to determine audio data, which may be representative of the sensed acoustic signals 125 and/or 135.

The example site meter 115 of FIG. 4 also includes an example watermark detector 410 to detect watermark(s) embedded in the audio data obtained from the sensor interface 405. In some examples, the watermark(s) is/are embedded in the frequency domain of the audio data. In such examples, the watermark detector 410 employs frequency domain processing to detect whether a valid watermark is embedded in the frequency domain of the audio data obtained from the sensor interface 405. Example watermark detection techniques that can be implemented by the watermark detector 410 to detect watermarks embedded in the frequency domain of audio data include, but are not limited to, examples disclosed in U.S. Pat. Nos. 8,359,205, 8,369,972 and U.S. Publication No. 2010/0223062, which are described in further detail above. In some examples, the watermark(s) is/are embedded in the time domain of the audio data. In such examples, the watermark detector 410 employs time domain processing, such as amplitude demodulation, phase demodulation, spread spectrum detection, etc., to detect whether a valid watermark is embedded in the time domain of the audio data obtained from the sensor interface 405.

The example site meter 115 of FIG. 4 further includes an example watermark classifier 415 to classify the watermark(s) detected by the watermark detector 410 in the audio data obtained from the sensor interface 405. For example, the acoustic signal 125 may include media watermark(s) embedded in the media presented by the media presentation device 110, whereas the acoustic signal 135 emitted by the user device 140 may include people monitoring watermark(s). The media watermark(s) may convey digital information identifying the media (e.g., a name of the media), a source of the media, etc., whereas the people monitoring watermark(s) may convey digital information identifying the user device 140 and/or the user 130 of the user device 140, etc. In such examples, the watermark classifier 415 examines characteristics of the detected watermark(s) to determine, for example, whether a detected watermark is a media watermark or a people monitoring watermark. In some such examples, the watermark classifier 415 examines the data conveyed by the detected watermark to classify the detected watermark as a media watermark or a people monitoring watermark. Additionally or alternatively, the watermark classifier 415 examines signal characteristics of the watermarks, such as the frequency band(s) in which the watermark was detected, to classify the detected watermark as a media watermark or a people monitoring watermark. For example, and as described above, the media watermark(s) may reside in a first range of frequencies (e.g., a first frequency band or set of bands), and the people monitoring watermark(s) may reside in a second range of frequencies (e.g., a second frequency band or set of bands) different from the first range of frequencies. In such examples, the watermark classifier 415 may classify a detected watermark as a media watermark if the watermark was detected in the first range of frequencies, and may classify a detected watermark as a people monitoring watermark if the watermark was detected in the second range of frequencies. In some examples, if the watermark classifier 415 classifies a detected watermark as a people monitoring watermark, the watermark classifier 415 associates information with the detected watermark that indicates the trigger condition(s) that would have triggered emission of the people monitoring watermark.

The example site meter 115 of FIG. 4 includes an example data reporter 420 to report the watermark information decoded by the example watermark detector 410 and any watermark classifications made by the watermark classifier 415 to, for example, the data processing facility 155 via the network 150. For example, the data reporter 420 can implement any wireless (e.g., WiFi, cellular data, etc.) and/or wired (e.g., USB, Ethernet, etc.) digital data interface capable of sending digital information over a network, such as the network 150, to a receiving device, such as the data processing facility 155.

While example manners of implementing the audience metering system 100 are illustrated in FIGS. 1-4, one or more of the elements, processes and/or devices illustrated in FIGS. 1-4 may be combined, divided, re-arranged, omitted, eliminated and/or implemented in any other way. Further, the example site meter 115, the example acoustic sensor 120, the example user devices 140, 140A and/or 140B, the example people meter 145, the example network 150, the example data processing facility 155, the example people monitor downloader 205, the example people monitoring watermarker 210, the example watermarked audio downloader 215, the example audio data store 220, the example audio watermarker 305, the example audio data store 310, the example audio circuitry 315, the example speaker(s) 320, the example trigger condition evaluator 325, the example input audio evaluator 330, the example clock 335, the example location determiner 340, the example device state evaluator 345, the example acoustic sensor 350, the example sensor interface 405, the example watermark detector 410, the example watermark classifier 415, the example data reporter 420 and/or, more generally, the example audience metering system 100 of FIGS. 1-4 may be implemented by hardware, software, firmware and/or any combination of hardware, software and/or firmware. Thus, for example, any of the example site meter 115, the example acoustic sensor 120, the example user devices 140, 140A and/or 140B, the example people meter 145, the example network 150, the example data processing facility 155, the example people monitor downloader 205, the example people monitoring watermarker 210, the example watermarked audio downloader 215, the example audio data store 220, the example audio watermarker 305, the example audio data store 310, the example audio circuitry 315, the example speaker(s) 320, the example trigger condition evaluator 325, the example input audio evaluator 330, the example clock 335, the example location determiner 340, the example device state evaluator 345, the example acoustic sensor 350, the example sensor interface 405, the example watermark detector 410, the example watermark classifier 415, the example data reporter 420 and/or, more generally, the example audience metering system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audience metering system 100, the example site meter 115, the example acoustic sensor 120, the example user devices 140, 140A and/or 140B, the example people meter 145, the example network 150, the example data processing facility 155, the example people monitor downloader 205, the example people monitoring watermarker 210, the example watermarked audio downloader 215, the example audio data store 220, the example audio watermarker 305, the example audio data store 310, the example audio circuitry 315, the example speaker(s) 320, the example trigger condition evaluator 325, the example input audio evaluator 330, the example clock 335, the example location determiner 340, the example device state evaluator 345, the example acoustic sensor 350, the example sensor interface 405, the example watermark detector 410, the example watermark classifier 415 and/or the example data reporter 420 is/are hereby expressly defined to include a tangible computer readable storage device or storage disk such as a memory, a digital versatile disk (DVD), a compact disk (CD), a Blu-ray disk, etc. storing the software and/or firmware. Further still, the example audience metering system 100 of FIGS. 1-4 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the example audience metering system 100, the example site meter 115, the example acoustic sensor 120, the example user devices 140, 140A and/or 140B, the example people meter 145, the example network 150, the example data processing facility 155, the example people monitor downloader 205, the example people monitoring watermarker 210, the example watermarked audio downloader 215, the example audio data store 220, the example audio watermarker 305, the example audio data store 310, the example audio circuitry 315, the example speaker(s) 320, the example trigger condition evaluator 325, the example input audio evaluator 330, the example clock 335, the example location determiner 340, the example device state evaluator 345, the example acoustic sensor 350, the example sensor interface 405, the example watermark detector 410, the example watermark classifier 415 and/or the example data reporter 420 are shown in FIGS. 5-12. In these examples, the machine readable instructions comprise one or more programs for execution by a processor, such as the processor 1312 shown in the example processor platform 1300 discussed below in connection with FIG. 13. The one or more programs, or portion(s) thereof, may be embodied in software stored on a tangible computer readable storage medium such as a CD-ROM, a floppy disk, a hard drive, a digital versatile disk (DVD), a Blu-Ray Disk™, or a memory associated with the processor 1312, but the entire program or programs and/or portions thereof could alternatively be executed by a device other than the processor 1312 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 5-12, many other methods of implementing the example audience metering system 100, the example site meter 115, the example acoustic sensor 120, the example user devices 140, 140A and/or 140B, the example people meter 145, the example network 150, the example data processing facility 155, the example people monitor downloader 205, the example people monitoring watermarker 210, the example watermarked audio downloader 215, the example audio data store 220, the example audio watermarker 305, the example audio data store 310, the example audio circuitry 315, the example speaker(s) 320, the example trigger condition evaluator 325, the example input audio evaluator 330, the example clock 335, the example location determiner 340, the example device state evaluator 345, the example acoustic sensor 350, the example sensor interface 405, the example watermark detector 410, the example watermark classifier 415 and/or the example data reporter 420 may alternatively be used. For example, with reference to the flowcharts illustrated in FIGS. 5-12, the order of execution of the blocks may be changed, and/or some of the blocks described may be changed, eliminated, combined and/or subdivided into multiple blocks.

As mentioned above, the example processes of FIGS. 5-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-12 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 5:
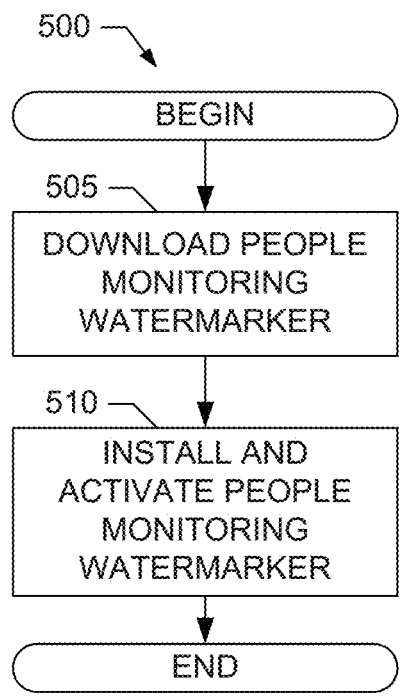
FIG. 5 is a flowchart representative of example machine readable instructions that may be executed by one or more of the example user devices of FIGS. 1 and/or 2 to download the example people monitoring watermarker of FIG. 3.

An example program 500 that may be executed by the example user devices 140 and/or 140A of FIGS. 1 and/or 2 to download the example people monitoring watermarker 210 is represented by the flowchart shown in FIG. 5. For convenience and without loss of generality, the example program 500 is described in the context of being executed by the example user device 140A. With reference to the preceding figures and associated written descriptions, the example program 500 of FIG. 5 begins execution at block 505 at which the user device 140A downloads the people monitoring watermarker 210 from the example data processing facility 155 via the example network 150, as described above. At block 510, the user device 140A installs and activates the people monitoring watermarker 210, as described above.

Figure 6:
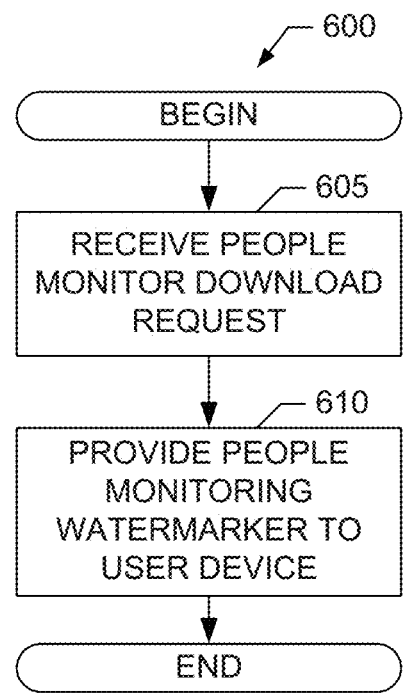
FIG. 6 is a flowchart representative of example machine readable instructions that may be executed by the example data processing facility of FIGS. 1 and/or 2 to provide the example people monitoring watermarker of FIG. 3 to one or more of the example user devices of FIGS. 1 and/or 2.

An example program 600 that may be executed by the example data processing facility 155 of FIGS. 1 and/or 2 to provide the example people monitoring watermarker 210 to user devices, such as the example user devices 140 and/or 140A, is represented by the flowchart shown in FIG. 6. With reference to the preceding figures and associated written descriptions, the example program 600 of FIG. 6 begins execution at block 605 at which the example people monitor downloader 205 of the data processing facility 155 receives a request via the network 150 from a user device, such as the user device 140 or 140A, to download the people monitoring watermarker 210, as described above. At block 610, the people monitor downloader 205 sends the people monitoring watermarker 210 to the requesting user device, as described above.

Figure 7:
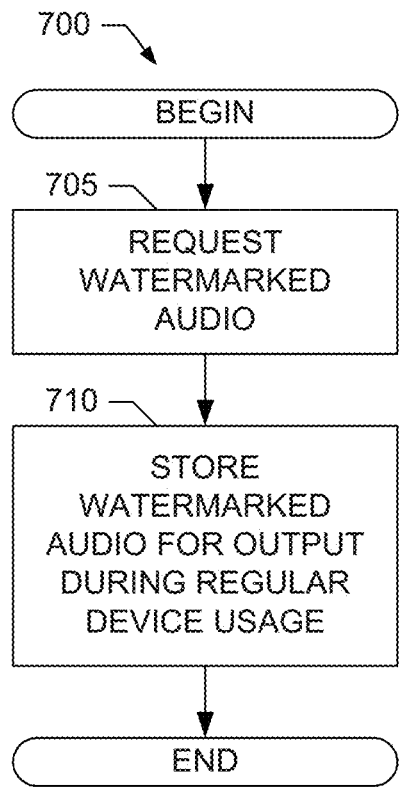
FIG. 7 is a flowchart representative of example machine readable instructions that may be executed by one or more of the example user devices of FIGS. 1 and/or 2 to download audio signal(s) watermarked for people monitoring.

An example program 700 that may be executed by the example user devices 140 and/or 140B of FIGS. 1 and/or 2 to download audio data watermarked with people monitoring watermarks is represented by the flowchart shown in FIG. 7. For convenience and without loss of generality, the example program 700 is described in the context of being executed by the example user device 140B. With reference to the preceding figures and associated written descriptions, the example program 700 of FIG. 7 begins execution at block 705 at which the user device 140B requests watermarked audio data from the example data processing facility 155 via the example network 150, as described above. At block 710, the user device 140B downloads and stores the requested watermarked audio data for output during use of the user device 140B, as described above.

Figure 8:
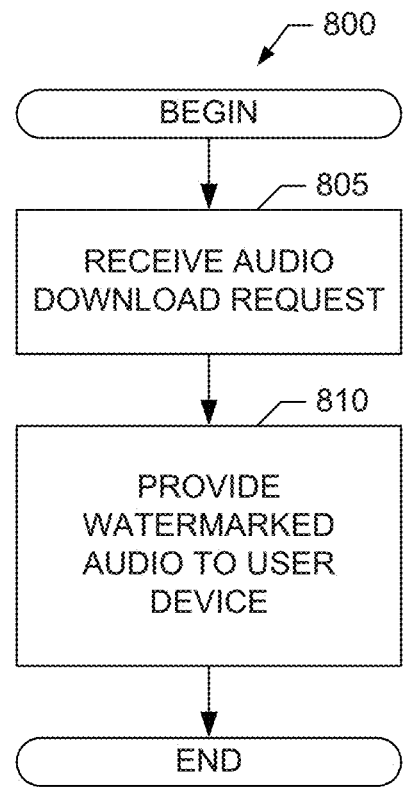
FIG. 8 is a flowchart representative of example machine readable instructions that may be executed by the example data processing facility of FIGS. 1 and/or 2 to provide audio signal(s) watermarked for people monitoring to one or more of the example user devices of FIGS. 1 and/or 2.

An example program 800 that may be executed by the example data processing facility 155 of FIGS. 1 and/or 2 to provide audio data watermarked with people monitoring watermarks to user devices, such as the example user devices 140 and/or 140B, is represented by the flowchart shown in FIG. 8. With reference to the preceding figures and associated written descriptions, the example program 800 of FIG. 8 begins execution at block 805 at which the example watermarked audio downloader 215 of the data processing facility 155 receives a request via the network 150 from a user device, such as the user device 140 or 140B, to download watermarked audio data, as described above. At block 810, the watermarked audio downloader 215 sends the requested watermarked audio data to the requesting user device, as described above.

Figure 9:
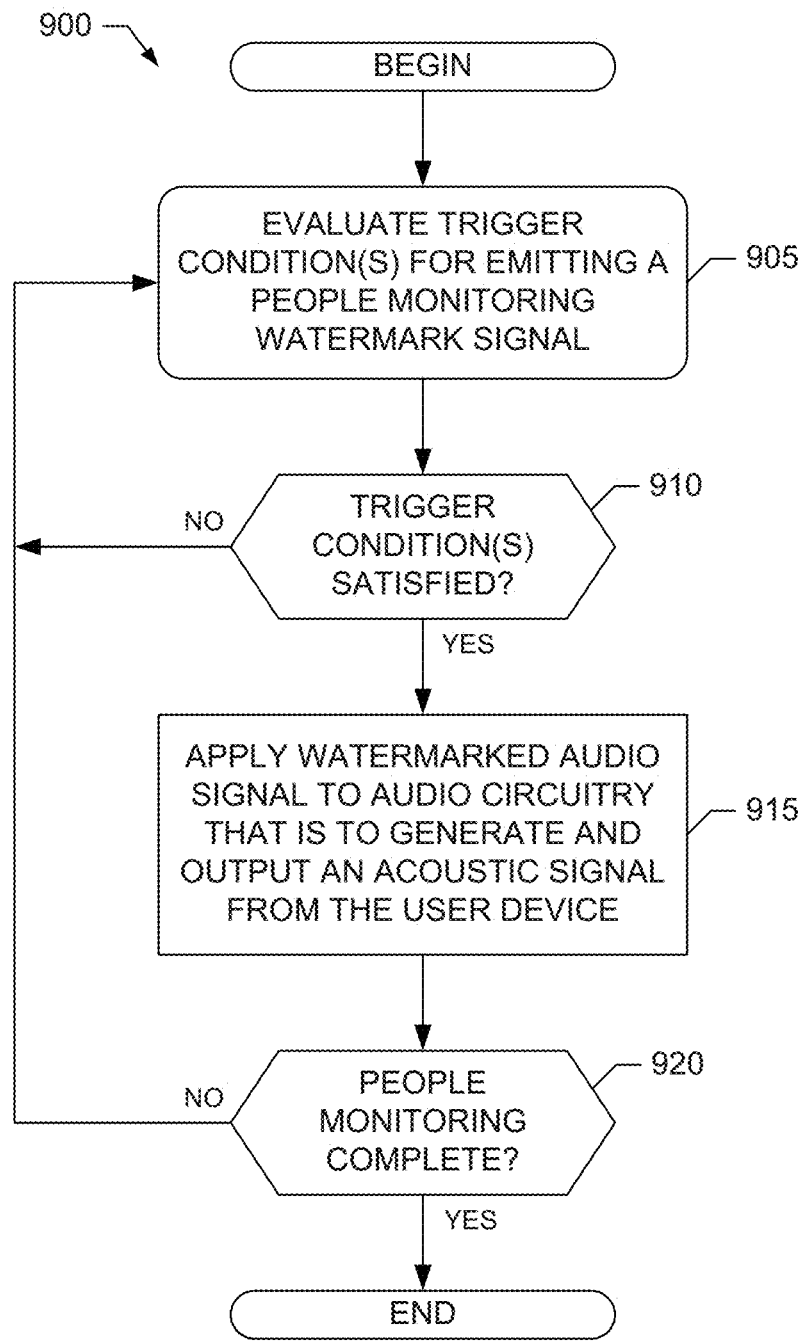
FIG. 9 is a flowchart representative of first example machine readable instructions that may be executed to implement the example people monitoring watermarker of FIG. 3.
Figure 11:
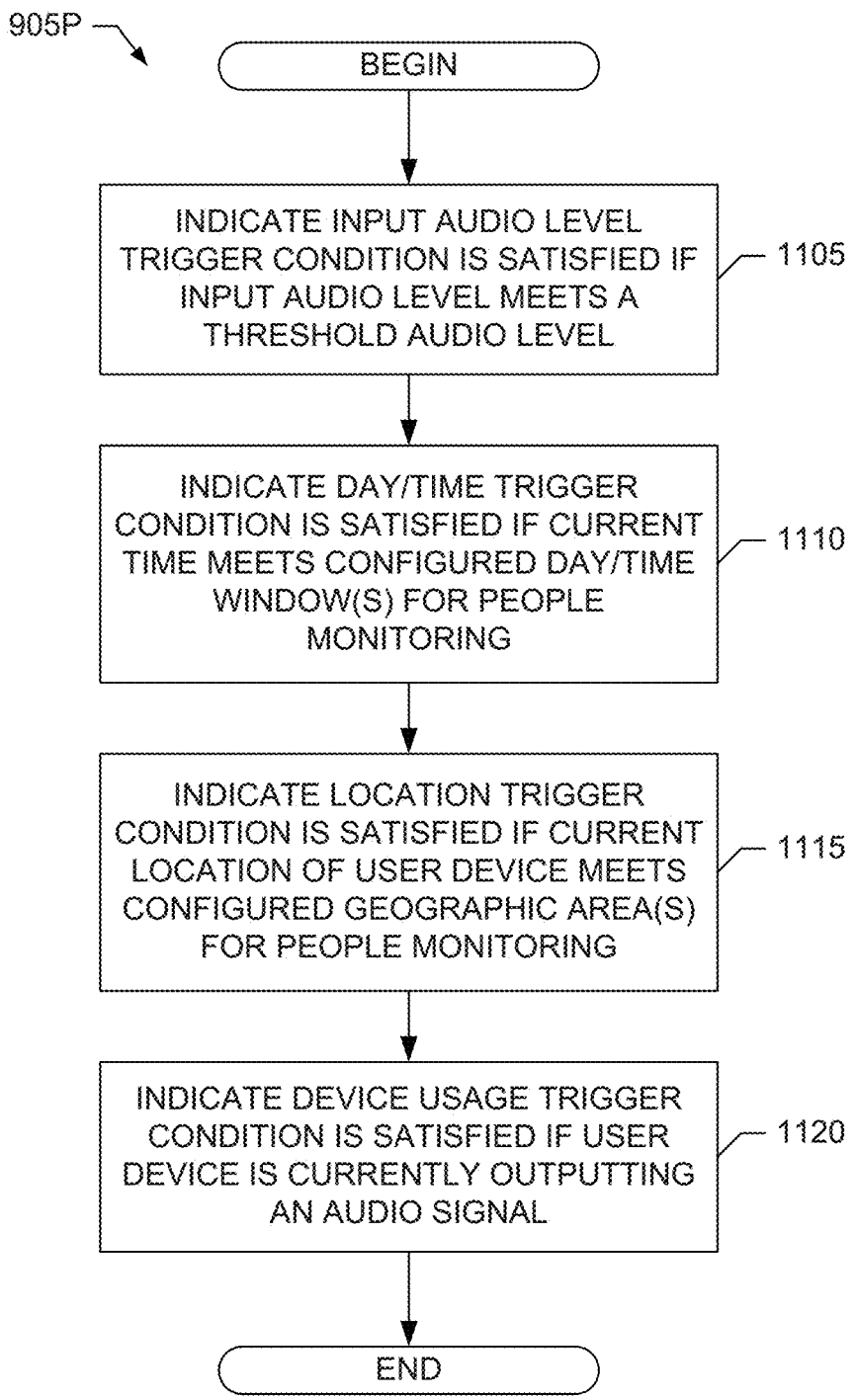
FIG. 11 is a flowchart representative of third example machine readable instructions that may be executed to implement the example people monitoring watermarker of FIG. 3.

A first example program 900 that may be executed to implement the example people monitoring watermarker 210 of FIGS. 2 and/or 3 in the example user device 140 and/or 140A of FIGS. 1 and/or 2 is illustrated in FIG. 9. The example program 900 may be executed at predetermined intervals, based on an occurrence of a predetermined event, etc., or any combination thereof. With reference to the preceding figures and associated written descriptions, the example program 900 of FIG. 9 begins execution at block 905 at which example trigger condition evaluator 325 of the people monitoring watermarker 210 evaluates, as described above, one or more trigger conditions for outputting an audio signal (e.g., emitting an acoustic signal) including one or more people monitoring watermarks. Example machine readable instructions that may be executed to implement the processing at block 905 are illustrated in FIG. 11, which is described in detail below.

At block 910, the trigger condition evaluator 325 determines whether the trigger condition(s) evaluated at block 905 have been satisfied. If the trigger condition(s) have been satisfied (block 910), then at block 915 the trigger condition evaluator 325 causes the example audio watermarker 305 of the people monitoring watermarker 210 to provide an audio signal including the people monitoring watermark(s) to the example audio circuitry 315, as described above. As also described above, the audio circuitry 315 is to process the audio signal provided by the audio watermarker 305 to generate and output (e.g., emit), from the user device 140/140A, a corresponding acoustic signal conveying the people monitoring watermark(s).

At block 920, the people monitoring watermarker 210 determines whether people monitoring is complete. If people monitoring is not complete (block 920), processing returns to block 905 and blocks subsequent thereto to enable the people monitoring watermarker 210 to cause people monitoring watermark(s) to continue to be output by (e.g., emitted from) the user device 140/140A. Otherwise, execution of the example program 900 ends.

Figure 10:
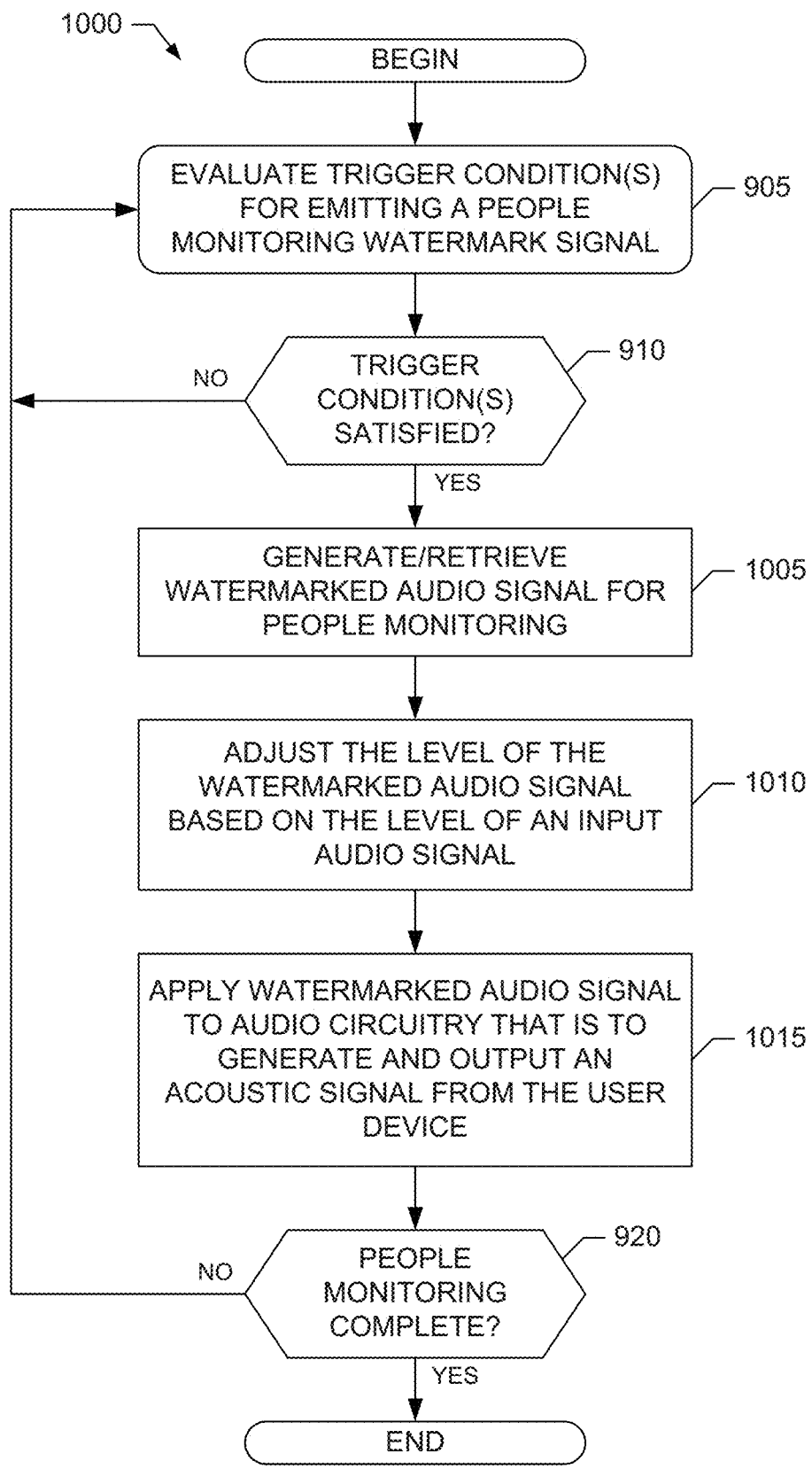
FIG. 10 is a flowchart representative of second example machine readable instructions that may be executed to implement the example people monitoring watermarker of FIG. 3.

A second example program 1000 that may be executed to implement the example people monitoring watermarker 210 of FIGS. 2 and/or 3 in the example user device 140 and/or 140A of FIGS. 1 and/or 2 is illustrated in FIG. 10. The example program 1000 may be executed at predetermined intervals, based on an occurrence of a predetermined event, etc., or any combination thereof. Similar blocks in FIGS. 9 and 10 are labelled with the same reference numerals. With reference to the preceding figures and associated written descriptions, the example program 1000 of FIG. 10 begins execution at blocks 905 and 910 at which the example trigger condition evaluator 325 of the people monitoring watermarker 210 evaluates, as described above, one or more trigger conditions for outputting an audio signal (e.g., emitting an acoustic signal) including one or more people monitoring watermarks. Example machine readable instructions that may be executed to implement the processing at block 905 are illustrated in FIG. 11, which is described in detail below.

At block 910, the trigger condition evaluator 325 determines whether the trigger condition(s) evaluated at block 905 have been satisfied. If the trigger condition(s) have been satisfied (block 910), then at block 1005 the trigger condition evaluator 325 causes the example audio watermarker 305 of the people monitoring watermarker 210 to generate or retrieve an audio signal including people monitoring watermark(s), as described above. At block 1010, the audio watermarker 305 adjusts, as described above, the level of the watermarked audio signal obtained at block 1005 based on an input audio signal level determined by the input audio evaluator 330. For example, and as described in detail above, at block 1010 the audio watermarker 305 may apply a gain factor or attenuation factor that causes the level of the audio signal obtained at block 1005, which includes the people monitoring watermark(s), to be less than or equal to (or a fraction of, etc.) the input audio level determined by the input audio evaluator 330 for the input audio signal. Such adjustments can increase the likelihood that the people monitoring watermark(s) is/are masked by the ambient audio. At block 1015, the audio watermarker 305 provides the adjusted audio signal, which includes the people monitoring watermark(s), to the example audio circuitry 315, as described above.

At block 920, the people monitoring watermarker 210 determines whether people monitoring is complete. If people monitoring is not complete (block 920), processing returns to block 905 and blocks subsequent thereto to enable the people monitoring watermarker 210 to cause people monitoring watermark(s) to continue to be output by (e.g., emitted from) the user device 140/140A. Otherwise, execution of the example program 1000 ends.

An example program 905P that may be executed to implement the example trigger condition evaluator 325 of the example people monitoring watermarker 210 of FIG. 3, and/or that may be used to implement the processing at block 905 of FIGS. 9 and/or 10, is illustrated in FIG. 11. With reference to the preceding figures and associated written descriptions, the example program 905P of FIG. 11 begins execution at block 1105 at which the trigger condition evaluator 325 indicates that an audio level trigger condition for emitting people monitoring watermark(s) is satisfied if an input audio level determined by the example input audio evaluator 330 of the people monitoring watermarker 210 meets a threshold audio level, as described above. At block 1110, the trigger condition evaluator 325 indicates that a clock (or day/time) trigger condition for emitting people monitoring watermark(s) is satisfied if the current time, as determined from clock information provided by the example clock 335 of the people monitoring watermarker 210, is within one of the time period(s) (or window(s)) specified for people monitoring, as described above. At block 1115, the trigger condition evaluator 325 indicates that a location trigger condition for emitting people monitoring watermark(s) is satisfied if the current location of the user device, as determined from location information provided by the example location determiner 340 of the people monitoring watermarker 210, is within one of the geographic area(s) specified for people monitoring, as described above. At block 1120, the trigger condition evaluator 325 indicates that a device state trigger condition for emitting people monitoring watermark(s) is satisfied if the example device state evaluator 345 of the people monitoring watermarker 210 indicates that the user device is already outputting an audio signal, such as a ringtone, an audible alert, an audio track, a movie, etc. (or is otherwise in a permitted operating state), as described above.

Figure 12:
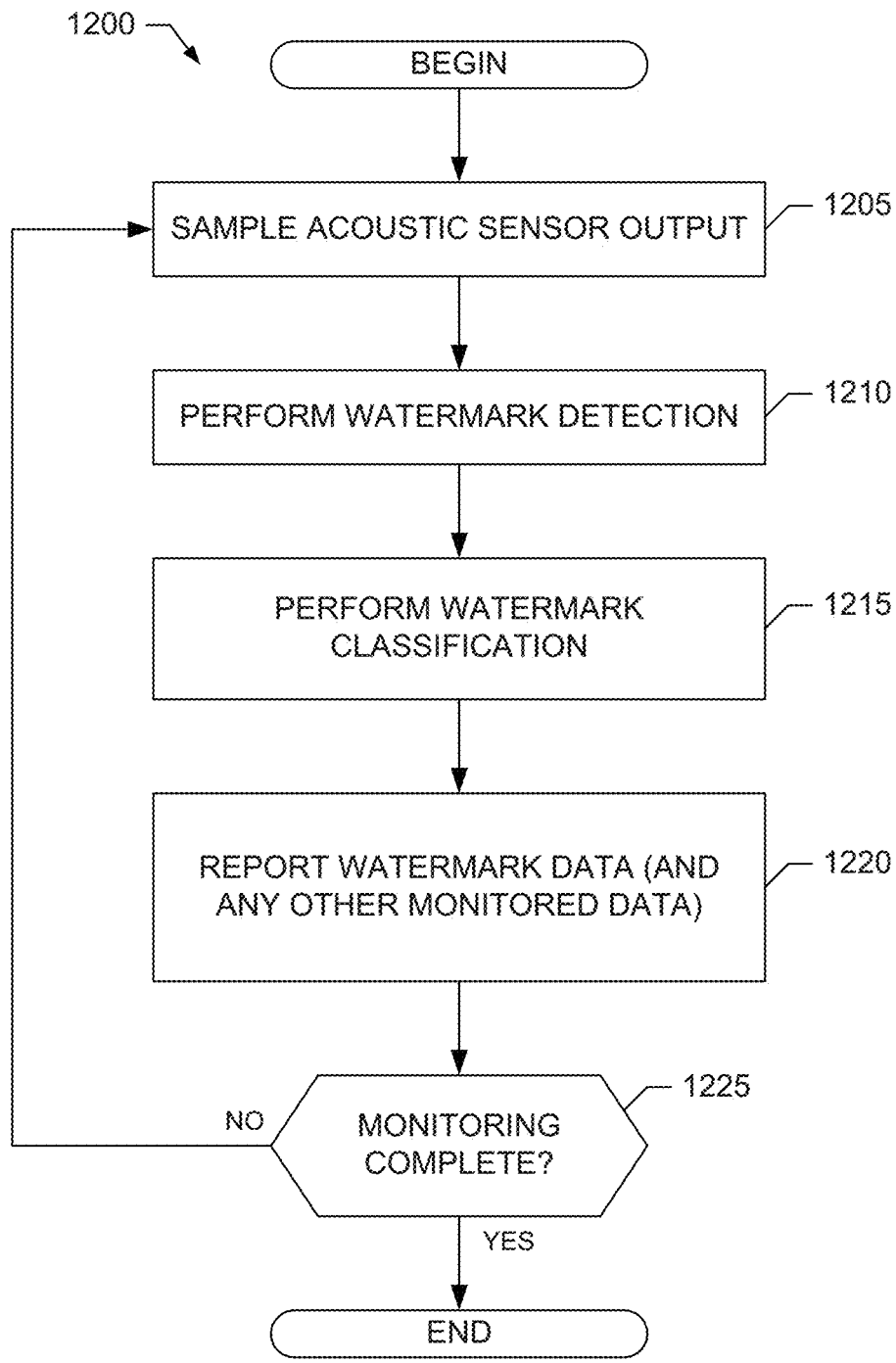
FIG. 12 is a flowchart representative of example machine readable instructions that may be executed to implement the example meter of FIGS. 1 and/or 4.

An example program 1200 that may be executed to implement the example site meter 115 of FIG. 1 is illustrated in FIG. 12. The example program 1200 may be executed at predetermined intervals, based on an occurrence of a predetermined event, etc., or any combination thereof. With reference to the preceding figures and associated written descriptions, the example program 1200 of FIG. 12 begins execution at block 1205 at which the example sensor interface 405 of the site meter 115 samples or otherwise obtains audio data from the example acoustic sensor(s) 120, as described above. At block 1210, the example watermark detector 410 of the site meter 115 performs watermark detection, as described above, to detect watermark(s) included in the audio data obtained at block 1205. At block 1215, the example watermark classifier 415 of the site meter 115 classifies the watermark(s) detected at block 1210. For example, and as described above, the watermark classifier 415 may classify the detected watermark(s) as media watermark(s), people monitoring watermark(s), etc. At block 1220, the example data reporter 420 of the site meter 115 reports the information decoded by the example watermark detector 410, the watermark classifications made by the watermark classifier 415, and/or any other data to the data processing facility 155, as described above.

At block 1225, the site meter 115 determines whether monitoring is complete. If monitoring is not complete (block 1225), processing returns to block 1205 and blocks subsequent thereto to enable the site meter 115 to continue monitoring. Otherwise, execution of the example program 1200 ends.

Figure 13:
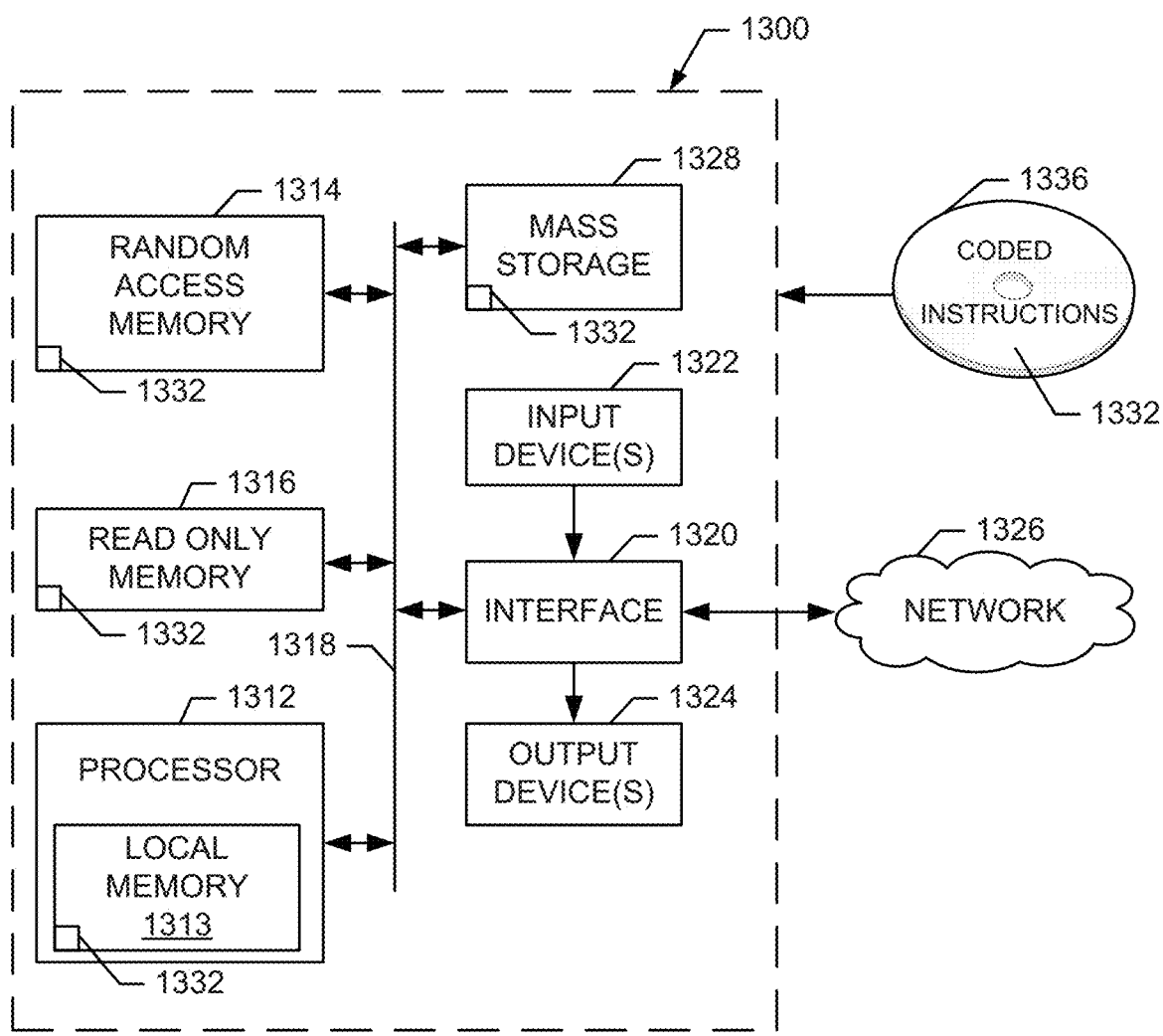
FIG. 13 is a block diagram of an example processor platform that may execute the example machine readable instructions of 5-11 and/or 12 to implement one or more of the example user devices of FIGS. 1 and/or 2, the example people monitoring watermarker of FIG. 3, the example meter of FIGS. 1 and/or 4, the example data processing facility of FIGS. 1 and/or 2, and/or the example audience measurement system of FIG. 1.

FIG. 13 is a block diagram of an example processor platform 1300 capable of executing the instructions of FIGS. 5-12 to implement the example audience metering system 100, the example site meter 115, the example acoustic sensor 120, the example user devices 140, 140A and/or 140B, the example people meter 145, the example network 150, the example data processing facility 155, the example people monitor downloader 205, the example people monitoring watermarker 210, the example watermarked audio downloader 215, the example audio data store 220, the example audio watermarker 305, the example audio data store 310, the example audio circuitry 315, the example speaker(s) 320, the example trigger condition evaluator 325, the example input audio evaluator 330, the example clock 335, the example location determiner 340, the example device state evaluator 345, the example acoustic sensor 350, the example sensor interface 405, the example watermark detector 410, the example watermark classifier 415 and/or the example data reporter 420 of FIGS. 1-4. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a link 1318. The link 1318 may be implemented by a bus, one or more point-to-point connections, etc., or a combination thereof. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1300, can allow the user to control the computer system and provide data to the computer using physical gestures, such as, but not limited to, hand or body movements, facial expressions, and face recognition.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID (redundant array of independent disks) systems, and digital versatile disk (DVD) drives.

Coded instructions 1332 corresponding to the instructions of FIGS. 5-12 may be stored in the mass storage device 1328, in the volatile memory 1314, in the non-volatile memory 1316, in the local memory 1313 and/or on a removable tangible computer readable storage medium, such as a CD or DVD 1336.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement meter comprising:
    an acoustic sensor configured to sense audio in a vicinity of a monitored media device;
    at least one processor;
    memory having stored therein instructions that, when executed by the at least one processor, cause the audience measurement meter to be configured to:
        detect a first watermark in a first audio signal obtained by the acoustic sensor, the first watermark to identify media presented by the monitored media device; and
        process the first audio signal obtained by the acoustic sensor to determine whether a second watermark, different from the first watermark, is embedded in the first audio signal, transmission of the second watermark triggered based on a time of day, the second watermark identifying at least one of a mobile device or a user of the mobile device;
        classify the second watermark as a media watermark or a people monitoring watermark based on a characteristic of the second watermark; and
        report, when the second watermark is determined to be embedded in the first audio signal, at least one of the second watermark or information decoded from the second watermark to identify at least one of the mobile device or the user of the mobile device as exposed to the media presented by the monitored media device.

2. The audience measurement meter of claim 1, wherein the characteristic of the second watermark corresponds to a frequency band in which the second watermark was detected, and the instructions further cause, when executed by the at least one processor, the audience measurement meter to be configured to:
    classify the second watermark as the media watermark when the frequency band corresponds to a first range of frequencies; or
    classify the second watermark as the people monitoring watermark when the frequency band corresponds to a second range of frequencies different from the first range of frequencies.

3. The audience measurement meter of claim 1, wherein the characteristic of the second watermark corresponds to data conveyed by the second watermark, and the instructions further cause, when executed by the at least one processor, the audience measurement meter to be configured to examine the data conveyed by the second watermark to classify the second watermark as the media watermark or the people monitoring watermark.

4. The audience measurement meter of claim 1, wherein the first watermark is conveyed in a first range of frequencies different from a second range of frequencies used to convey the second watermark.

5. The audience measurement meter of claim 1, wherein the first watermark is substantially inaudible to human hearing and the second watermark is substantially inaudible to human hearing.

6. The audience measurement meter of claim 1, wherein the first watermark is substantially inaudible to human hearing and the second watermark is substantially audible to human hearing.

7. A people monitoring method comprising:
    detecting, by executing an instruction with at least one processor, a first watermark in a first audio signal obtained by an acoustic sensor, the first watermark identifying media presented by a monitored media device;
    determining, by executing an instruction with the at least one processor, whether a second watermark, different from the first watermark, is embedded in the first audio signal obtained by the acoustic sensor, transmission of the second watermark triggered based on a geographic location of a mobile device, the second watermark identifying at least one of the mobile device or a user of the mobile device;
    classifying, by executing an instruction with the at least one processor, the second watermark as a media watermark or a people monitoring watermark based on a characteristic of the second watermark; and
    when the second watermark is determined to be embedded in the first audio signal, reporting at least one of the second watermark or information decoded from the second watermark to identify at least one of the mobile device or the user of the mobile device as exposed to the media presented by the monitored media device.

8. The method of claim 7, wherein the characteristic of the second watermark corresponds to a frequency band in which the second watermark was detected, and the classifying includes:
    classifying the second watermark as the media watermark when the frequency band corresponds to a first range of frequencies; or classifying the second watermark as the people monitoring watermark when the frequency band corresponds to a second range of frequencies different from the first range of frequencies.

9. The method of claim 7, wherein the characteristic of the second watermark corresponds to data conveyed by the second watermark, and the classifying includes examining the data conveyed by the second watermark to classify the second watermark as the media watermark or the people monitoring watermark.

10. The method of claim 7, wherein the first watermark is conveyed in a first range of frequencies different from a second range of frequencies used to convey the second watermark.

11. The method of claim 7, wherein the first watermark is substantially inaudible to human hearing and the second watermark is substantially inaudible to human hearing.

12. The method of claim 7, wherein the first watermark is substantially inaudible to human hearing and the second watermark is substantially audible to human hearing.

13. The method of claim 7, wherein the first watermark is included in a media signal output from the monitored media device, and the second watermark is output from the mobile device.

14. At least one non-transitory computer readable storage medium having stored thereon computer readable instructions that, when executed by at least one processor of a system, cause the system to at least:
  detect a first watermark in a first audio signal obtained by an acoustic sensor, the first watermark to identify media presented by a monitored media device;
  determine whether a second watermark, different from the first watermark, is embedded in the first audio signal obtained by the acoustic sensor, transmission of the second watermark triggered based on an operating state of a mobile device, the second watermark identifying at least one of the mobile device or a user of the mobile device;
  classify the second watermark as a media watermark or a people monitoring watermark based on a characteristic of the second watermark; and
  when the second watermark is determined to be embedded in the first audio signal, report at least one of the second watermark or information decoded from the second watermark to identify at least one of the mobile device or the user of the mobile device as exposed to the media presented by the monitored media device.

15. The at least one non-transitory computer readable storage medium of claim 14, wherein the characteristic of the second watermark corresponds to a frequency band in which the second watermark was detected, and the instructions further cause, when executed by the at least one processor, the system to:
  classify the second watermark as the media watermark when the frequency band corresponds to a first range of frequencies; or
  classify the second watermark as the people monitoring watermark when the frequency band corresponds to a second range of frequencies different from the first range of frequencies.

16. The at least one non-transitory computer readable storage medium of claim 14, wherein the characteristic of the second watermark corresponds to data conveyed by the second watermark, and the instructions further cause, when executed by the at least one processor, the system to examine the data conveyed by the second watermark to classify the second watermark as the media watermark or the people monitoring watermark.

17. The at least one non-transitory computer readable storage medium of claim 14, wherein the first watermark is conveyed in a first range of frequencies different from a second range of frequencies used to convey the second watermark.

18. The at least one non-transitory computer readable storage medium of claim 14, wherein the first watermark is substantially inaudible to human hearing and the second watermark is substantially inaudible to human hearing.

19. The at least one non-transitory computer readable storage medium of claim 14, wherein the first watermark is substantially inaudible to human hearing and the second watermark is substantially audible to human hearing.

20. The at least one non-transitory computer readable storage medium of claim 14, wherein the first watermark is included in a media signal output from the monitored media device, and the second watermark is output from the mobile device.

* * * * *